United States Patent
Uchida et al.

(10) Patent No.: US 7,502,614 B2
(45) Date of Patent: Mar. 10, 2009

(54) RADIO COMMUNICATION SYSTEM, RADIO COMMUNICATION APPARATUS AND RADIO COMMUNICATION METHOD, AND COMPUTER PROGRAM

(75) Inventors: Shigenori Uchida, Kanagawa (JP); Mitsuhiro Suzuki, Chiba (JP); Kazuyuki Sakoda, Tokyo (JP)

(73) Assignee: Sony Corporation (JP)

( * ) Notice: Subject to any disclaimer, the term of this patent is extended or adjusted under 35 U.S.C. 154(b) by 169 days.

(21) Appl. No.: 10/472,738

(22) PCT Filed: Feb. 14, 2003

(86) PCT No.: PCT/JP03/01583

§ 371 (c)(1),
(2), (4) Date: Apr. 23, 2004

(87) PCT Pub. No.: WO03/069925

PCT Pub. Date: Aug. 21, 2003

(65) Prior Publication Data
US 2004/0180658 A1 Sep. 16, 2004

(30) Foreign Application Priority Data
Feb. 18, 2002 (JP) .............................. 2002-040738

(51) Int. Cl.
*H04Q 7/20* (2006.01)
(52) U.S. Cl. .................. 455/436; 455/502; 455/442; 455/63.1; 455/67.13; 455/69; 375/346; 370/335; 370/342; 370/331
(58) Field of Classification Search ......... 455/436–444, 455/421, 450, 453, 63.1, 67.11, 423, 502, 455/67.13, 69; 375/356, 346; 370/331–332, 370/335, 342
See application file for complete search history.

(56) References Cited

U.S. PATENT DOCUMENTS

| | | | | |
|---|---|---|---|---|
| 5,267,261 A * | 11/1993 | Blakeney et al. | ............ | 370/332 |
| 5,392,331 A * | 2/1995 | Patsiokas et al. | ............ | 455/442 |
| 5,640,414 A * | 6/1997 | Blakeney et al. | ............ | 375/130 |
| 5,784,368 A * | 7/1998 | Weigand et al. | ............ | 370/350 |
| 5,862,124 A * | 1/1999 | Hottinen et al. | ............ | 370/335 |
| 6,167,240 A * | 12/2000 | Carlsson et al. | .......... | 455/67.13 |
| 6,298,248 B1 * | 10/2001 | Miyoshi et al. | ............ | 455/561 |
| 6,526,039 B1 * | 2/2003 | Dahlman et al. | ............ | 370/350 |
| 6,771,934 B2 * | 8/2004 | Demers et al. | ............. | 455/63.1 |
| 6,917,821 B2 * | 7/2005 | Kadous et al. | ........... | 455/562.1 |
| 6,954,644 B2 * | 10/2005 | Johansson et al. | ........... | 455/438 |
| 6,980,615 B2 * | 12/2005 | Dick et al. | .................. | 375/356 |
| 7,039,405 B2 * | 5/2006 | Dillinger et al. | ............ | 455/436 |

(Continued)

*Primary Examiner*—Sharad Rampuria
(74) *Attorney, Agent, or Firm*—Lerner, David, Littenberg, Krumholz & Mentlik, LLP

(57) ABSTRACT

A radio communication network that requires no connection between base stations during handoff or when the cell is overloaded, is realized by using a receiver that has a multi-user detection function and a transmitter for synthesizing control information and user data to output the synthesized data. Upon reception of a signal that is transmitted from a mobile station located on the boundary with a neighboring cell, the base station synthesizes user data for a mobile station in its local cell and control information for controlling the handoff operation to transmit the synthesized data. In response to this transmission, a mobile station in the neighboring cell separates the control information by multi-user detection to detect the signal and transmits a handoff request to the base station.

14 Claims, 13 Drawing Sheets

MULTI-CELL MULTIPLE-ACCESS RADIO COMMUNICATION ENVIRONMENT

U.S. PATENT DOCUMENTS

2001/0024430 A1* 9/2001 Sekine et al. ............... 370/331
2001/0053695 A1* 12/2001 Wallentin ................... 455/436
2002/0154713 A1* 10/2002 Sparrman et al. ........... 375/346

* cited by examiner

MULTI-CELL MULTIPLE-ACCESS RADIO COMMUNICATION ENVIRONMENT

RADIO COMMUNICATION SYSTEM, RADIO COMMUNICATION APPARATUS AND RADIO COMMUNICATION METHOD, AND COMPUTER PROGRAM

TECHNICAL FIELD

The present invention relates to radio communication systems in which a plurality of mobile terminals simultaneously communicates with one base station by multiple-access, radio communication apparatuses and radio communication methods, and computer programs and, more particularly, to a radio communication system having a multi-cell multiple-access structure in which the interference within and outside a cell is eliminated to expand the capacity (communication capability), a radio communication apparatus and radio communication method, and a computer program.

More specifically, the present invention relates to radio communication systems in which repetition of frequency at shorter intervals increases the communication capability, radio communication apparatuses and radio communication methods, and computer programs and, more particularly, to a radio communication system that requires no connection between base stations, for example, during handoff or when the cell is overloaded, a radio communication apparatus and radio communication method, and a computer program.

BACKGROUND ART

Mobile communication that has originated from the discovery of radio waves has been under research and development because of the necessity of communication with vessels, aircrafts, and trains. The targets of communication have been expanded into automobiles and human beings. Not only telegraphic and telephone messages but also computer data and multimedia content such as images can be transmitted through mobile communication.

In recent years, reduction in size and cost of mobile terminals has rapidly advanced owing to the improvement of manufacturing technology and the like. Expansion of information communication services and so on causes mobile terminals to be personalized, like mobile phones. Additionally, deregulation of communication and reduction of communication fee causes increased growth in user population.

Basically, in mobile communication, a mobile station, such as an in-vehicle phone and a mobile phone, detects the nearest base station to communicate radio waves between the mobile station and the base station. A range over which the radio waves sent from one base station can propagate is referred to as a "cell". The cell is ordinarily a circle having a predetermined radius around an antenna mounted at the base station. Arrangement of cells with no space therebetween constitutes a communication service area.

FIG. 15 schematically illustrates the cell structure in a mobile radio communication system, typified by a cellular system, in which the service area is two-dimensionally expanded with a plurality of base stations. Providing base stations (not shown) at predetermined intervals and continuously (non-sparsely) arranging a plurality of cells offered by the respective base stations, as shown in FIG. 15, allow a mobile station to communicate with the base stations from anywhere, thus constituting a wide service area.

The advantages of the cells that are used in the mobile communication system include the following ones; that is, the propagation of the radio waves that are sent from a base station only within the corresponding cell causes the same frequency to be repeatedly used in other cells for efficiently utilizing limited frequency resources, and the division into the cells causes the radio-wave output for communication to be decreased for reducing in size of a mobile body that is usually installed as a battery-driven mobile device and for saving electric power. Recently, the reduction in size of the cells is increasingly advanced owing to the increase of the number of mobile phone users and so on.

A plurality of mobile terminals exists in one cell and they simultaneously communicate with one base station. In other words, from the point of the base station, it is necessary to detect which signal is transmitted from each user by multiple-access, that is, by multiplexing radio signals (multi-user detection).

Multiple-access technologies in radio communication include time division multiple access (TDMA) and frequency division multiple access (FDMA).

The TDMA is a communication system in which the communication channel is divided in advance into time slots on a time basis and different time slots are allocated to the respective mobile terminals, which simultaneously communicate with each other. The TDMA is assumed to be a digital system.

The FDMA is a communication system in which different frequencies are allocated to the respective mobile terminals, which simultaneously communicate with each other, (that is, different frequencies are allocated for every communication channel), to establish communication. Namely, multiple channels that are used for communication are arranged on a frequency basis and idle channels are appropriately allocated to the respective mobile terminals for use. The FDMA is accommodated to either analog or digital communication system.

For example, in the same cell, a base station can simultaneously connect to a plurality of mobile stations in its local cell by the TDMA. In such a case, one TDMA frame is divided into a plurality of time domains, each being allocated to an uplink or a downlink of each mobile station. A method, for example, channel allocation is employed for the allocation of the time domains.

Between cells, switching a frequency channel that is used to another frequency channel for communication by the FDMA allows the problems of interference waves from outside the local cell around the cell boundary to be eliminated.

Within one cell, the base station transmits (broadcasts) a beacon (identification signal) or other control information to perform synchronization within the local cell, identify the cell, specify the frequency channel to be used, and so on.

How to enhance the communication capability with fewer resources poses a big task in a radio communication environment in which the mobile communication has become quickly widespread and multiple mobile stations exist in one cell. In such a radio communication environment, the multi-user detection for detecting a plurality of users in a cell is highly important. With a known radio communication system, there is no benefit given by multiplexing signals for someone other than a desired person for transmission. This is because the interference is simply increased to lower the communication quality. In other words, there is no known radio communication system on the assumption of the multi-user detection and of the synthesis of user data and the control information to transmit the synthesized data.

Meanwhile, in the service area in which small cells are arranged with no space therebetween as shown in FIG. 15, the base station to be connected must be shifted in connection with a mobile station that moves from one cell to another cell. Such a shift of the base station to be connected at a mobile station is referred to as "handover" or "handoff". The opportunity for the handoff is increased as the cells are downsized.

The mobile station must determine the base station to be linked to next, that is, must perform cell detection, for every handoff. For example, the move of the mobile station toward the cell boundary causes the communication quality of desired waves from the local base station to be lowered and permits the reception of interference signals from outside the local cell, so that it is necessary for detecting another base station having higher communication quality. The cell detection is performed also on startup of the device.

In a known cellular system, the switching of the control information between base stations through a control-switching station starts the handoff procedure. FIG. 16 is a diagram showing an example of a multi-cell environment in a cellular communication system. Referring to FIG. 16, a mobile station 201 moves toward a cell 13 while communicating with a base station 102 in a cell 12. The function for switching the target of the communication signal for a subscriber station from the transceiver in the original base station 102 to the transceiver in a next transceiver 103, when the mobile station 201 is to cross the cell boundary, is referred to as "handoff".

The handoff techniques in the cellular communication system are mainly divided into two categories; "soft handoff" and "hard handoff". With either handoff technique, the communication must be established between the base stations for informing that the mobile station is a target for the handoff when the mobile station switches the base station to be connected in the cell boundary. Such communication between base stations is established through a backbone. Namely, an infrastructure, such as a mobile communication control center, for controlling the base stations is necessary, as shown in FIG. 17.

The hard handoff ordinarily occurs in the vicinity of the cell boundary. In this case, the base station continuously measures the power of the received signal from the mobile station that is communicated with and determines whether the power of the received signal from the mobile station in the vicinity of the cell boundary is lower than a rated value. The base station in the candidate cell to be switched to and the base station in the original cell must communicate the information concerning the handoff with each other through the backbone in order to quickly perform the handoff without suspending the call in progress.

The soft handoff is continuously performed within a range apart from the base station in the original cell and the base station in the cell to be switched to by a predetermined distance. In the soft handoff, when the mobile station moves in the vicinity of the boundary between cells, it is connected to both base stations in the respective cells. It is determined whether the switching is performed based on the reception of a pilot signal from the mobile station. A telephone switching center, that is, the control-switching station that exists on the backbone of the corresponding network determines the point where the switching from the base station in the original cell is performed.

With either handoff technique, it is essential to establish some kind of connection between the base stations in order to realize the cellular handoff in a multi-cell environment. Hence, the number of control-switching stations is increased in accordance with the increase in the number of the base stations, thus causing a problem in that the cellular network is complicated. Since the shift to higher frequency band has been advanced in accordance with the request for high capacity and the request for high communication speed in recent years, it is anticipated, based on the propagation characteristic or the like, that the size of the cells is reduced, that is, the number of the base stations is increased. The reduction in traffic of the backbone that connects the base stations is an important concern.

When the number of users connected to a base station increases (that is, the cell is overloaded) and the number of users connected to another base station next the above base station is small, a control method is proposed for forcedly performing the handoff of the mobile station that is connected to one base station while being located in the vicinity of the boundary between the base stations, to the other base station. Also in such a case, the resource management information at each base station must be communicated through the control-switching station by using the resources in the backbone, thus increasing the traffic in the backbone.

In order to expand the calling areas with no space therebetween by using a known handoff technique, the constructor of the base station (access point) must allocate the frequency according to planning such that the base station in a neighboring cell does not use the same frequency for eliminating the interference. The infrastructure is designed so as to reduce the load of the mobile station by providing the base station that is fixedly installed with various control functions. Under such design of a radio span, the mobile terminal is obliged to rely on the base station as for the control, so that the mobile-station-driven control operation cannot be expected in a radio layer.

DISCLOSURE OF INVENTION

It is an object of the present invention to provide a superior radio communication system in which a plurality of mobile terminals simultaneously communicates with one base station by multiple-access, a radio communication apparatus and radio communication method, and a computer program.

It is another object of the present invention to provide a superior radio communication system in which a mobile station can switch the base station to another base station outside its local cell without requiring connection between the base stations, for example, during handoff or when the cell is overloaded, a radio communication apparatus and radio communication method, and a computer program.

It is another object of the present invention to provide a superior radio communication system in which mobile-terminal-driven handoff can be realized even if the base stations are planlessly provided, a radio communication apparatus and radio communication method, and a computer program.

The present invention provides, in its first aspect, a radio communication system having a multi-cell multi-user structure in which cells where the respective base stations are capable of communicating are adjacently or closely arranged. Each base station has a multi-user detection function. The base station determines that a mobile station outside its local cell approaches the boundary with a neighboring cell based on the detection of a transmitted signal from the mobile station for identifying a user, and mixes and synthesizes a signal for a mobile station within the local cell and a signal for the mobile station outside the local cell to output the synthesized signal.

The "system" here refers to a logical group of a plurality of devices (or functional modules for realizing a certain function). It does not matter whether each device or functional module is contained in a single casing (this is also true for the following description).

In the radio communication system according to the first aspect of the present invention, the base station can synthesize user data for a mobile station within the local cell and control information for controlling the handoff operation, which is for a mobile station outside the local cell, upon reception of a transmitted signal from a mobile station located on the boundary with a neighboring cell, to transmit the synthesized data. In response to this transmission, the mobile station in the neighboring cell separates the control information by multi-user detection to detect the signal and transmits a handoff request to the base station. The base station returns a handoff-enabling signal when it accepts the handoff request. The mobile station can disconnect from the original base station to perform handoff. Accordingly, the amount of traffic on a backbone does not need to be increased in the handover of a mobile station because no connection between base stations is required.

The present invention provides, in its second aspect, a radio communication system having a multi-cell multi-user structure in which cells where the respective base stations are capable of communicating are adjacently or closely arranged. Each mobile station in the multi-user structure has a multi-user detection function. The mobile station determines that the mobile station approaches the boundary with a neighboring cell based on the detection of a transmitted signal from a base station outside its local cell for identifying a user, and mixes and synthesizes a signal for the base station within the local cell and a signal for the base station in the neighboring cell to output the synthesized signal.

In the radio communication system according to the second aspect of the present invention, the mobile station can synthesize user data for the base station within the local cell and control information for controlling the handoff operation, which is for the base station of the neighboring cell, upon reception of a transmitted signal from the base station of a neighboring cell, to transmit the synthesized data. In response to this transmission, the base station in the neighboring cell separates the control information by multi-user detection to detect the signal and returns a handoff-enabling signal when it accepts a handoff request. The mobile station can disconnect from the original base station to perform handoff. Accordingly, as in the first aspect of the present invention, the amount of traffic on the backbone does not need to be increased in the handover of a mobile station because no connection between base stations is required.

The present invention provides, in its third aspect, a radio communication apparatus or a radio communication method operating in a radio communication environment that has a multi-cell multi-user structure in which cells where the respective base stations are capable of communicating are adjacently or closely arranged. The radio communication apparatus or the radio communication method includes multi-user detection means or a multi-user detection step for detecting a plurality of received signals as desired signals, and multiple-signal transmission means or a multiple-signal transmission step for mixing and synthesizing a signal for a station within a local cell and a signal for a station outside the local cell in response to the detection of a transmitted signal from the station outside the local cell for identifying a user by the multi-user detection means or in the multi-user detection step to output the synthesized signal.

In the radio communication apparatus or method according to the third aspect of the present invention, for example, user data for a station within a local cell is mixed with control information for a station outside the local cell to transmit the mixed data. At a receiver side, it is possible to demodulate the control information as desired signals by multi-user detection. Accordingly, the amount of traffic on the backbone does not need to be increased in the handover of a mobile station or when a cell is overloaded, even if no connection is established between base stations, because the control information that is mixed with the ordinary user data can be transmitted and received between cells.

The multi-user detection means or step can be realized by applying an interference cancellation technique such as so-called SIC (Successive Interference Cancellation). Specifically, the multi-user detection means or step detects all the received signals by demodulating the received signals, each being the sum of noise and an incoming signal that is transmitted from each transmitting station within and outside the local cell and is propagated through each propagation characteristic, in the descending order of its received power, and repeating a process of canceling the signals at a receiving station.

In order to preferably realize the multi-user detection in accordance with the received power at a receiver side, the multiple-signal transmission means or step preferably exchanges the transmission power of a signal for a station within the local cell for that of a signal for a station outside the local cell to output them at a transmitter side.

When the radio communication apparatus or method according to the third aspect of the present invention operates as a base station that is connected to one or more mobile stations in its local cell, the multiple-signal transmission means or step may mix and synthesize a signal for a mobile station within the local cell and a signal for a mobile station outside the local cell to output the synthesized signal, upon determining that the mobile station outside the local cell approaches the boundary with a neighboring cell based on the detection of a transmitted signal from the mobile station outside the local cell for identifying the user by the multi-user detection means or in the multi-user detection step. The radio communication apparatus or method may enable handoff in response to a request for the handoff from the mobile station outside the local cell.

When the radio communication apparatus or method according to the third aspect of the present invention operates as a mobile station that is located in a cell provided by a base station, the multiple-signal transmission means or step may mix and synthesize a signal for the base station within the local cell and a signal for the base station in a neighboring cell to output the synthesized signal, upon determining that the mobile station approaches the boundary with the neighboring cell based on the detection of a transmitted signal from a base station outside the local cell for identifying the user by the multi-user detection means or in the multi-user detection step. The radio communication apparatus or method may perform handoff in response to handoff allowance from the base station in the neighboring cell.

The present invention provides, in its fourth aspect, a radio communication apparatus or a radio communication method operating in a radio communication environment having a multi-user structure. The radio communication apparatus or the radio communication method includes signal generation means or a signal generation step for generating a plurality of transmitted signals for a plurality of transmission targets, and multiplex-synthesis transmission means or a multiplex-synthesis transmission step for mixing and synthesizing the transmitted signals and changing the transmission power of the transmitted signals for every transmission target when outputting them.

In the radio communication environment having a multi-user structure, the radio communication apparatus operating as a receiver receives the transmitted signals from the plural transmission sources as the sum of signals that are supplied through the respective propagation characteristics. The individual signals can be demodulated as desired signals by performing the multi-user detection in accordance with the received power by applying an interference cancellation technique such as SIC. With the radio communication apparatus or the radio communication method according to the fourth aspect of the present invention, the plural transmitted signals are mixed and synthesized to output the synthesized signal by changing the transmission power for every transmission target on the assumption that the multi-user detection in accordance with the received power is performed at a receiver side. Accordingly, each transmitted signal can be preferably detected for identifying a user in accordance with the received power at the receiver side.

The present invention provides, in its fifth aspect, a computer program that is described in a computer-readable form to cause a computer system to execute a process for radio communication in a radio communication environment having a multi-cell multi-user structure in which cells where the respective base stations are capable of communicating are adjacently or closely arranged. The computer program includes a multi-user detection step for detecting plural received signals as desired signals and a multiple-signal transmission step for mixing and synthesizing a signal for a station within a local cell and a signal for a station outside the local cell to output the synthesized signal in response to the detection of a transmitted signal from the station outside the local cell for identifying a user in the multi-user detection step.

The computer program according to the fifth aspect of the present invention defines a computer program that is described in a computer-readable form, for realizing a certain process on a computer system. In other words, the installation of the computer program according to the fifth aspect of the present invention on the computer system causes the computer system to carry out a cooperative operation, thus achieving an operational effect similar to the one achieved in the radio communication apparatus or the radio communication method according to the second aspect of the present invention.

The above and other objects, features, and advantages of the present invention will become clear from the following description of the preferred embodiments taken in conjunction with the attached drawings.

BEST MODE FOR CARRYING OUT THE INVENTION

The present invention realizes a cellular network that requires no connection between base stations, for example, during handoff or when the cell is overloaded, by using a receiver that has a multi-user detection function and a transmitter for synthesizing control information and user data to output the synthesized data.

Namely, upon reception of a signal that is transmitted from a mobile station located on the boundary with a neighboring cell, a base station synthesizes user data for a mobile station in its local cell and control information for controlling handoff operation to transmit the synthesized data. In response to this transmission, the mobile station in the neighboring cell separates the control information by multi-user detection to detect the signal and transmits a handoff request to the base station. On the other hand, when the mobile station requests handoff, it synthesizes user data and control information for controlling handoff operation to transmit the synthesized data. In response to this transmission, the base station in a neighboring cell separates the control information by multi-user detection to detect the signal and receives the handoff request.

In order to perform the multi-user detection, that is, to detect a plurality of signals, an interference cancellation technique such as SIC (Successive Interference Cancellation) can be applied. With the SIC, repetition of the process of demodulating the received signals, each being the sum of an incoming signal that has been propagated from each transmitting station to a receiving station through the corresponding propagation characteristic and noise, in the descending order of their received power and of canceling signals at the receiving station allows all the received signals to be detected. For example, a multiple-access communication system, in which the multi-user detection by the SIC by using all the received signals as desired signals is used to realize a multi-cell structure in which one frequency is repeated by using a non-diffusion mechanism, is disclosed in Japanese Patent Application No. 2002-7959 that has been already assigned to the applicant.

The multi-user detection by using the SIC technique will now be described.

Figure 1:
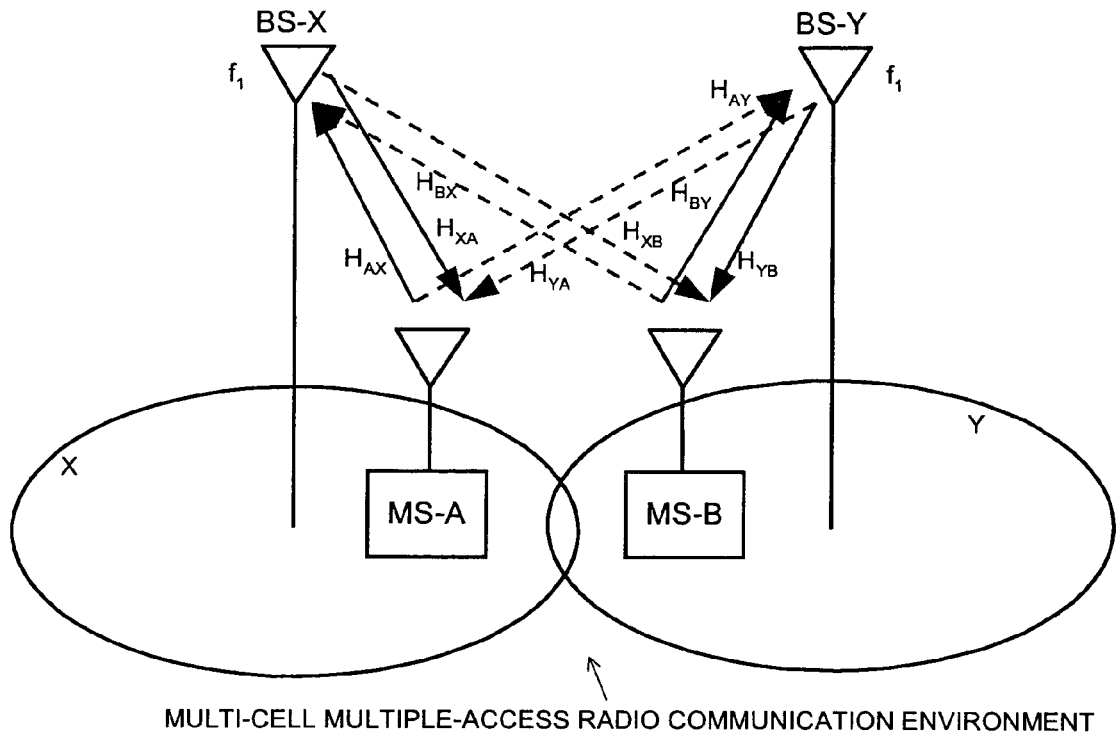
FIG. 1 is a diagram schematically showing the structure of a multi-cell multiple-access radio communication environment.

A multi-cell multiple-access radio communication environment, as shown in FIG. 1, is proposed. It is assumed that one frequency is repeated in the non-diffusion mechanism that does not use a diffusion series for the multiple access (that is, that does not perform CDMA (code division multiple access)).

In the example in FIG. 1, one mobile terminal MS-A exists in a cell X in which a base station BS-X can establish communication and one mobile terminal MS-B exists in a cell Y provided by a base station BS-Y. It is assumed that the cell X is arranged next to the cell Y and that both the base station BS-X of the cell X and the base station BS-Y of the cell Y, which is arranged next to the cell X or adjacent to the cell X, can use the same frequency $f_1$ to connect to the respective mobile stations at the same time.

Although only one mobile terminal is provided in each cell for simplifying the description and avoiding a complicated drawing, multiple mobile terminals may actually exist in each cell. It is to be understood that many adjacent cells are arranged around the cells X and Y to constitute an extended communication service area.

At a certain time in FIG. 1, the mobile station MS-A establishes communication with the base station BS-X and the mobile station MS-B establishes communication with the base station BS-Y. The same frequency is used for communication between the base station and the mobile station in both pairs and the base station and the mobile station in both pairs are connected to each other at the same time.

The signals that the mobile station MS-A receives at its down line is the sum of signals that are transmitted from the base station BS-X in the local cell to the mobile station MS-A and received in the mobile station MS-A with a propagation characteristic $H_{XA}$ (desired waves) and signals that are transmitted from the base station BS-Y outside the local cell to the mobile station MS-B and received in the mobile station MS-A with a propagation characteristic $H_{YA}$ (interference waves). Similarly, the signals that the mobile station MS-B receives at its down line is the sum of signals that are transmitted from the base station BS-Y to the mobile station MS-B and received in the mobile station MS-B with a propagation characteristic $H_{YB}$ (desired waves) and signals that are transmitted from the base station BS-X outside the local cell to the mobile station MS-A and received in the mobile station MS-B with a propagation characteristic $H_{XB}$ (interference waves).

The signals that the base station BS-X receives at its up line is the sum of signals that are transmitted from the mobile station MS-A in the local cell to the base station BS-X and received in the base station BS-X with a propagation characteristic $H_{AX}$ (desired waves) and signals that are transmitted from the mobile station MS-B outside the local cell to the base station BS-Y and received in the base station BS-X with a propagation characteristic $H_{BX}$ (interference waves). Similarly, the signals that the base station BS-Y receives at its up line is the sum of signals that are transmitted from the mobile station MS-B in the local cell to the base station BS-Y and received in the base station BS-Y with a propagation characteristic $H_{BY}$ (desired waves) and signals that are transmitted from the mobile station MS-A outside the local cell to the base station BS-X and received in the base station BS-Y with a propagation characteristic $H_{AY}$ (interference waves).

Ordinarily, in order to suppress such interference, the signal transmission toward stations outside the local cell is suppressed. In contrast, according to the present invention, the signal transmission toward stations outside the local cell is affirmatively performed at the transmitter side and both the signals within the local cell and the signals from stations outside the local cell are demodulated by the multi-user detection at the receiver side.

In other words, at least one of the base station and the mobile station provides the multi-user detection function by using the SIC and can receive the desired waves both from within its local cell and from outside its local cell. At a radio transmission side that communicates with such a base station or a mobile station, two or more kinds of transmission data, for example, user data and control information, can be synthesized for transmitting the synthesized data. Such operating characteristics can be positively utilized for, for example, handoff between cells, which will be described below.

Figure 2:
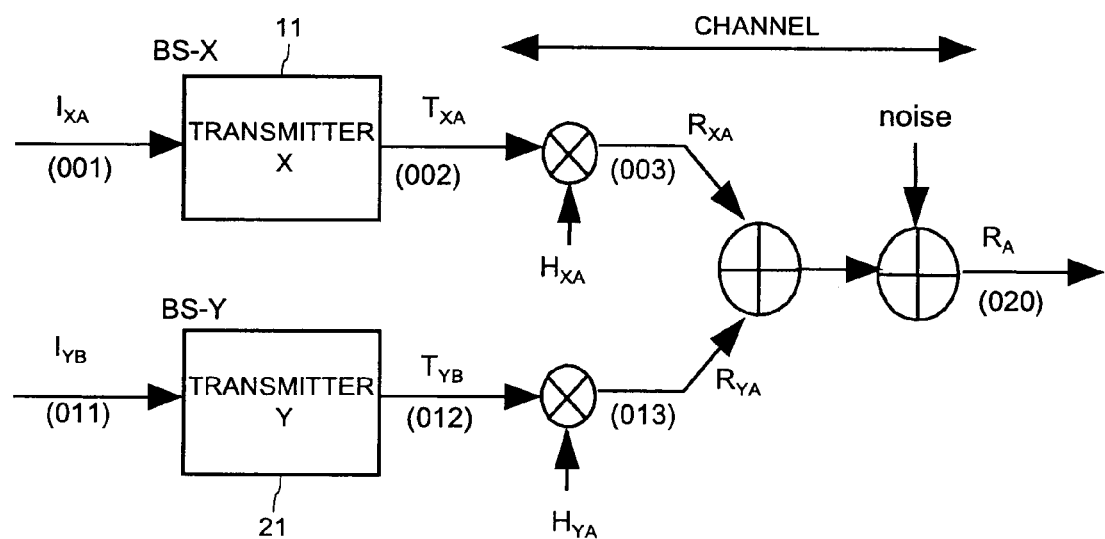
FIG. 2 is a diagram schematically showing the channel structure of a mobile station MS-A in the reception.

FIG. 2 is a diagram schematically showing the channel structure of the mobile station MS-A in the reception. As shown in FIG. 1, the mobile station MS-A receives the signals from the base station BS-X in its local cell and the signals that are transmitted from the base station BS-Y outside its local cell to the mobile station MS-B, in its down line. A case in which the mobile station MS-A performs the multi-user detection will be exemplified.

The base station BS-X performs signal processing such as modulation or up-conversion for transmission information $I_{XA}$ (001) by a transmitter X 11 to convert the transmission information $I_{XA}$ to a transmitted signal $T_{XA}$ (002) for transmission. The base station BS-Y performs signal processing such as modulation or up-conversion for transmission information $I_{YB}$ (011) by a transmitter Y 21 to convert the transmission information $I_{YB}$ to a transmitted signal $T_{YB}$ (012) for transmission.

The transmitted signal $T_{XA}$ (002) is propagated to the mobile station BS-X through a propagation characteristic $H_{XA}$ and the transmitted signal $T_{YB}$ (012) is propagated to the mobile station BS-X through a propagation characteristic $H_{YA}$. Thermal noise is added on the way to the mobile station BS-X. As a result, a received signal $R_A$ (020) received at the mobile station MS-A is given by the following equation:

$$R_A = H_{XA}T_{XA} + H_{YA}T_{YB} + \text{noise}$$

Since a receiving side that receives the received signal $R_A$ (the mobile station MS-A in this case) detects the information concerning two information sources, that is, the base stations BS-X and BS-Y, it performs interference cancellation on the assumption that the number of users are two.

Figure 3:
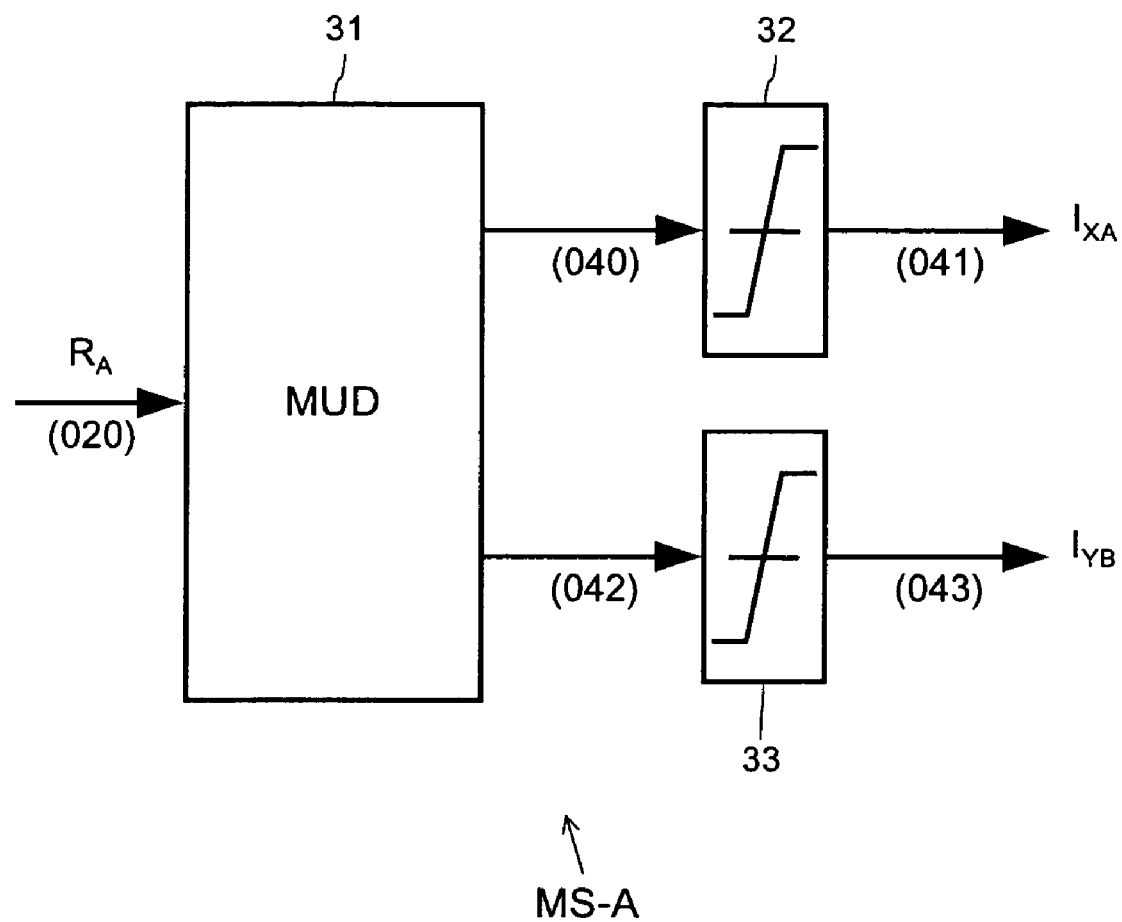
FIG. 3 is a diagram schematically showing the functional structure of a receiver side receiving a received signal $R_A$ that is the sum of two transmitted signals $R_{XA}$ and $R_{YA}$ and noise.

FIG. 3 is a diagram schematically showing the functional structure of a receiver side receiving the received signal $R_A$ that is the sum of two transmitted signals $R_{XA}$ and $R_{YA}$ and noise. As shown in FIG. 3, the receiver side includes a multi-user detection entity (MUD) 31 that detects a user from the received signal $R_A$ (020) and hard-decision decoders 32 and 33 for estimating transmission information $I_{XA}$ and $I_{YB}$, respectively, by hard-decision decoding the two signals extracted from the received signals.

The multi-user detection entity 31 performs the multi-user detection on the assumption that the number of users is two. According to this embodiment, the multi-user detection is performed by the SIC based on the strength of the received signals. In the SIC, all the received signals are detected by repetition of the process of demodulating the received signals in the descending order of their received power and of canceling the signals at the receiver side. It is generally assumed that a user who transmits a signal of higher strength has higher reliability.

Figure 4:
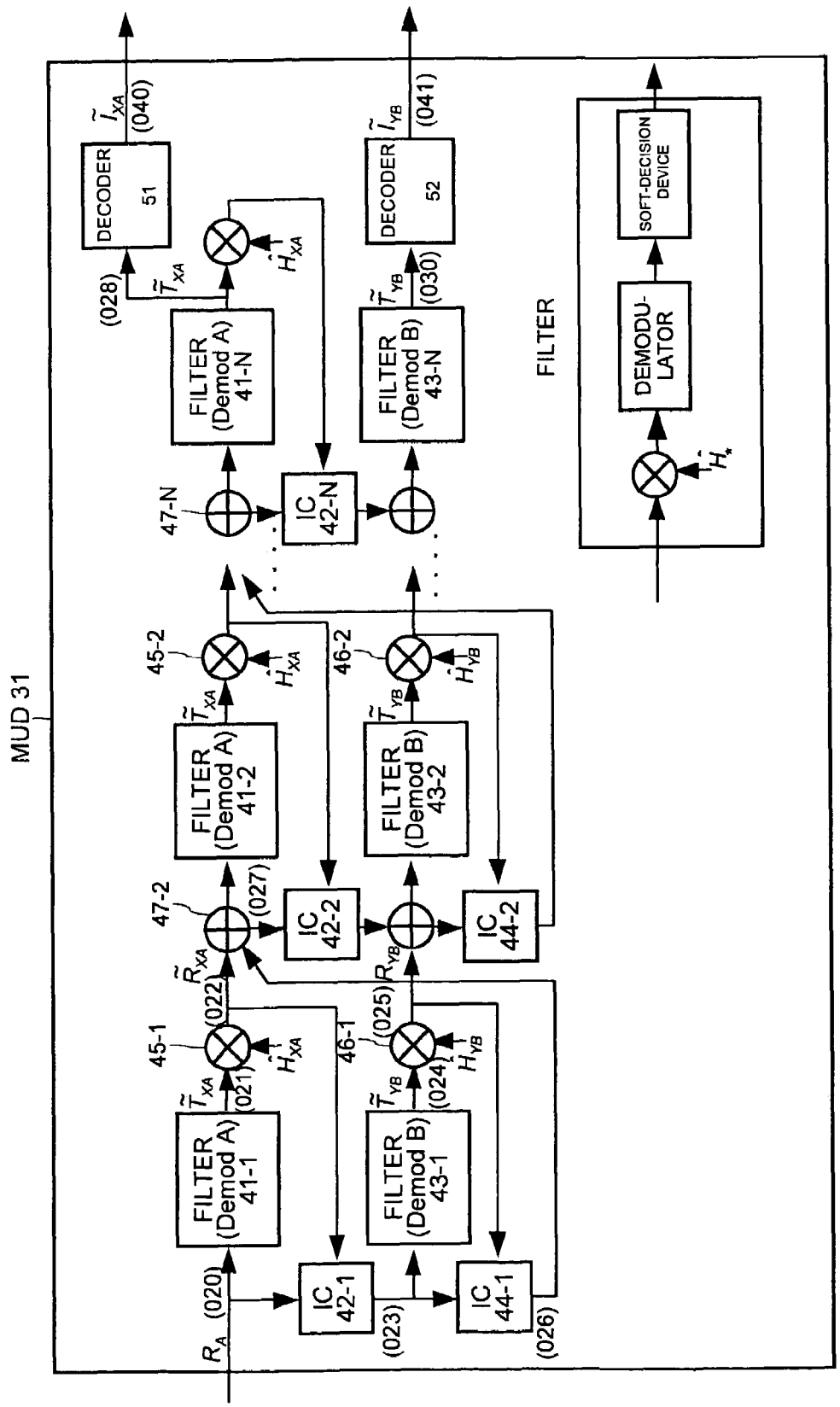
FIG. 4 is a diagram showing in detail the internal structure of a multi-user detection entity 31 that is structured by using SIC.

FIG. 4 is a diagram showing in detail the internal structure of the multi-user detection entity 31 that is structured by using the SIC. As shown in FIG. 4, the multi-user detection entity 31 has, as one basic unit of a interference cancellation process, a filter (Demod A) 41 for correcting the received signal $R_A$ based on the propagation characteristic $H_{XA}$ and estimating the transmitted signal $T_{XA}$ from the base station BS-X by demodulation and soft decision (or hard decision) decoding, an interference canceller (IC) 42 for subtracting the received signal that is transmitted from the base station BS-X from all the received signals based on the estimated result for the transmitted signal $T_{XA}$, a filter (Demod B) 43 for correcting the result of the interference cancellation based on the propagation characteristic $H_{XA}$ and estimating the transmitted signal $T_{YB}$ from the base station BS-Y by demodulation and soft decision (or hard decision) decoding, and an interference canceller (IC) 44 for subtracting the received signal that is transmitted from the base station BS-Y from all the received signals based on the estimated result for the transmitted signal $T_{YB}$. The number of times the basic unit is repeated is determined in consideration of the precision of signal processing and the processing cost.

When $R_A$ is received through the corresponding propagation path, a filter 41-1 outputs a replica (021) of the transmitted signal $T_{XA}$ from the base station BS-X to the corresponding mobile station MS-A by using the estimated value of the propagation characteristic $H_{XA}$.

The multiplication of the replica (021) of the transmitted signal $T_{XA}$ from the base station BS-X to the corresponding mobile station MS-A by the estimated value of the propagation characteristic $H_{XA}$ by a multiplexer 45-1 generates a replica (022) of a transmission path output from the base station BS-X to the mobile station MS-A.

The replica (022) of the transmission path output from the base station BS-X to the mobile station MS-A is an interference component for the mobile station MS-B. An interference canceller 42-1 subtracts the replica (022) that is an interference component from the received signal $R_A$ (020) and supplies the subtracted result (023) to a filter 43-1. The filter 43-1 outputs a replica (024) of the transmitted signal $T_{YB}$ from the base station BS-Y to the corresponding mobile station MS-B by using the estimated value of the propagation characteristic $H_{YB}$.

The multiplication of the replica (024) of the transmitted signal $T_{YB}$ from the base station BS-Y to the corresponding mobile station MS-B by the estimated value of the propagation characteristic $H_{YB}$ by a multiplexer 46-1 generates a replica (025) of a transmission path output from the base station BS-Y to the mobile station MS-B.

The replica (025) of the transmission path output from the base station BS-Y to the mobile station MS-B is an interference component for the mobile station MS-A. An interference canceller 44-1 subtracts the replica (025) that is an interference component from the subtracted result (023) in the interference canceller 42-1.

The addition of the replica (022) of the transmission path output from the base station BS-X to the mobile station MS-A and the subtracted result (026) in the interference canceller 44-1 by an adder 47-2 generates an input (027) that is supplied to the next-stage interference-cancellation-process unit 40-2. Similar interference cancellation process is repeated.

When the number of times the interference cancellation process is repeated reaches a predetermined number N, an output (028) from a filter 41-N in the mobile station MS-A is supplied to a decoder A 51 that outputs a replica (029) of the transmission information $I_{XA}$ supplied to the mobile station MS-A. In the same manner, an output (030) from a filter 43-N in the mobile station MS-B is supplied to a decoder B 52 that outputs a replica (031) of the transmission information $I_{YB}$ supplied to the mobile station MS-B.

After the multi-user detection described above is completed, replicas (040) and (042) from the respective base stations BS-X and BS-Y undergo hard-decision decoding to generate decided values (041) and (043).

The mobile station MS-A utilizes the decided value (041) for $I_{XA}$ among the decided values (041) and (043). Similarly, the mobile station MS-B utilizes the decided value (043) for $I_{YB}$ among the decided values (041) and (043).

Consequently, although the base stations BS-X and BS-Y use the same frequency $f_1$, they can be connected to the mobile stations MS-A and MS-B, respectively, at the same time. In other words, since the repetition by using one frequency can be realized, the communication capability is greatly increased. The non-diffusion mechanism, which does not use the diffusion series, uses a lower frequency band and therefore the increase in communication capability can be anticipated.

Although the multi-user detection is described above in the context of the down line from the base station to the mobile station, the multi-user detection can be achieved even in the up line from the mobile station to the base station if each base station implements the interference cancellation technique such as the SIC.

According to this embodiment, the operating characteristics in which the receiver side has the multi-user detection function to receive the desired waves from both within and outside its local cell is affirmatively utilized for the handoff between cells and the like. A radio communication environment shown in FIG. 5 will now be described.

Figure 5:
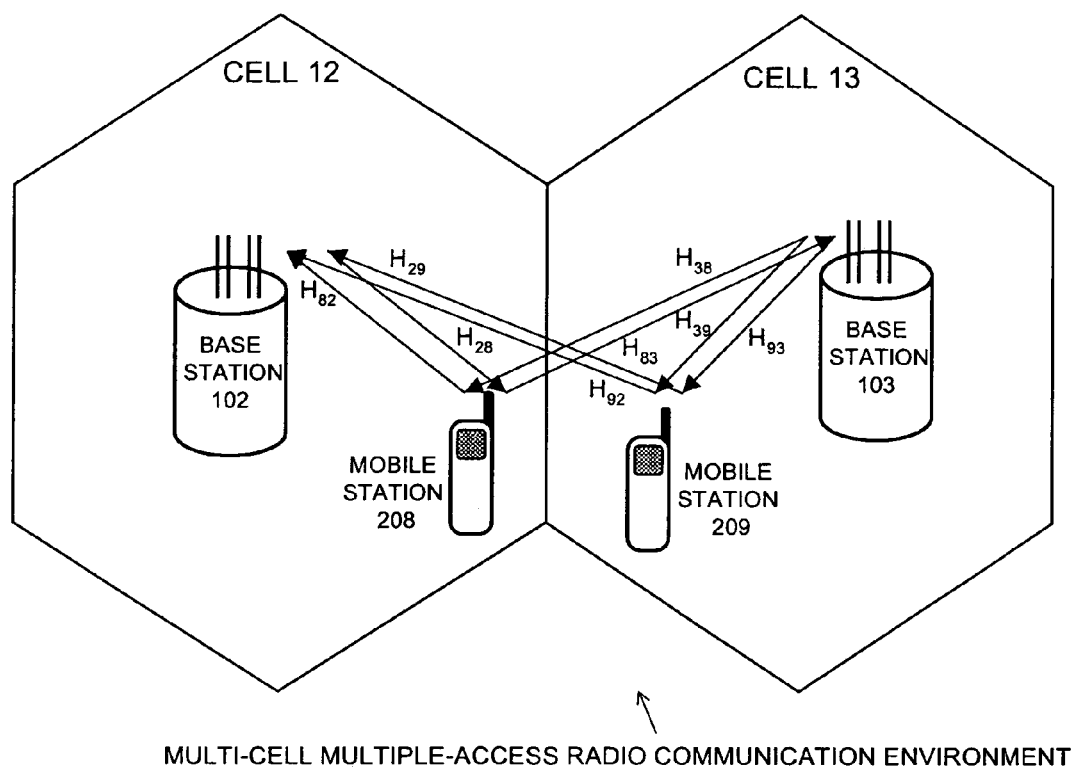
FIG. 5 is a diagram schematically showing a multi-cell multiple-access radio communication environment, according to an embodiment of the present invention, in which handoff operation is performed.

In the radio communication environment in FIG. 5, which is a multi-cell structure in which one frequency is repeated by using a non-diffusion mechanism, multiple access is realized in each cell by time division multiplexing. For simplicity, one mobile station 208 is operating in a cell 12 that is structured by a base station 102 and one mobile station 209 is operating in a neighboring cell 13 that is structured by a base station 103.

Figure 6:
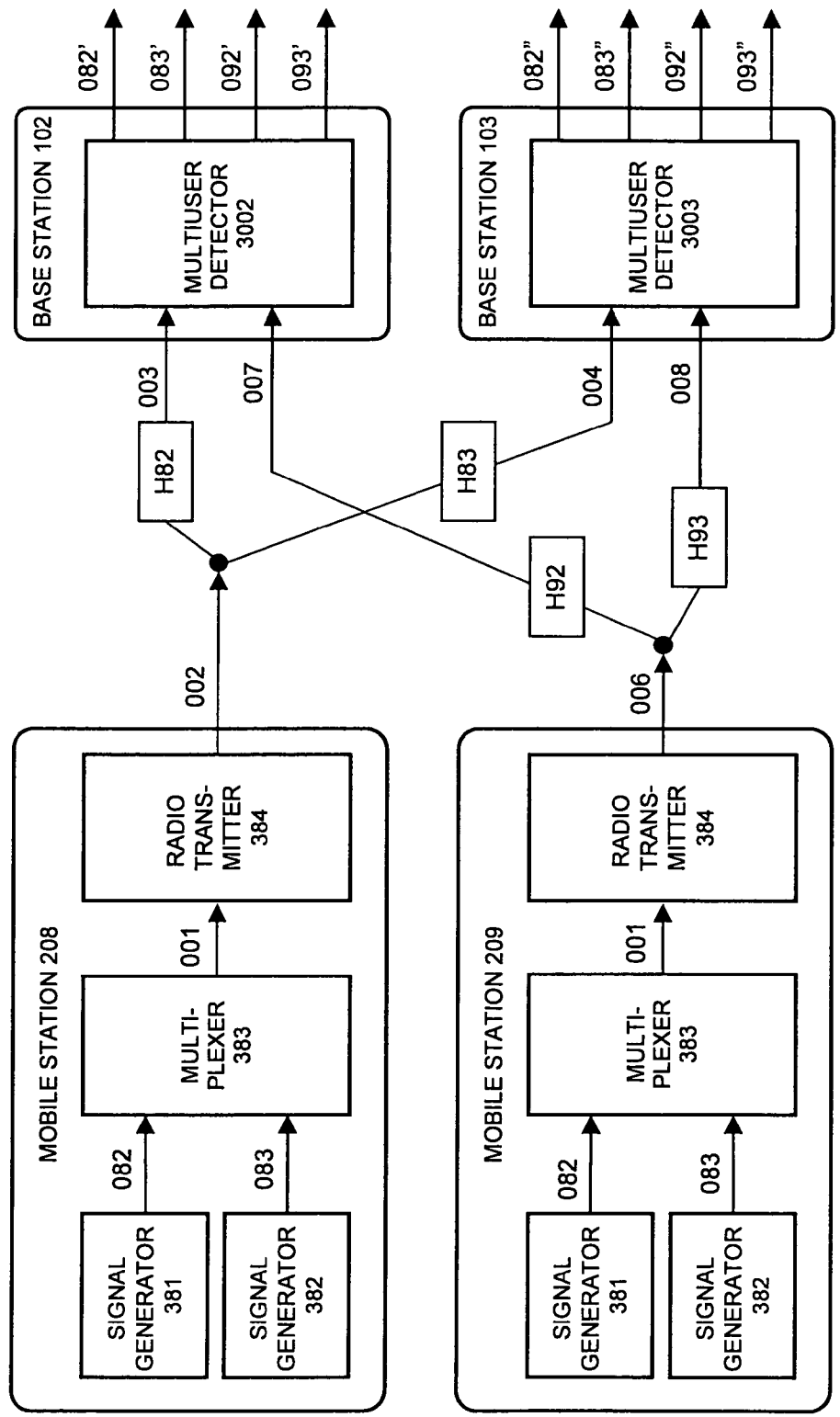
FIG. 6 is a diagram schematically showing the functional structure for performing multi-user detection at a base station in the multi-cell multiple-access radio communication environment shown in FIG. 5.

FIG. 6 is a diagram schematically showing the functional structure for performing the multi-user detection at a base station in the multi-cell multiple-access radio communication environment shown in FIG. 5.

The mobile station 208 includes a signal generator 381 for generating a transmitted signal 082 that has user data for the base station 102 in its local cell, a signal generator 382 for generating a transmitted signal 083 that has control information for the base station 103 outside its local cell, a multiplexer 383 for mixing the two transmitted signals by time division multiplexing or the like, and a radio transmitter 384 for transmitting a multiplexed signal 001 as a transmitted signal 002. The entities of the signal generators 381 and 382 are, for example, processing processes generated for every transmission target. While the signal generator 382 ordinarily operates when the mobile station 208 is within the cell 12, the signal generator 383 starts to operate when the mobile station 208 is located in the vicinity of the boundary with the neighboring cell 13 (described below). When the base stations 102 and 103 perform the multi-user detection based on the strength of the received signals, like the SIC, the radio transmitter 384 preferably exchanges the transmission power for the user data for that for the control information to output them.

The mobile station 209 includes a signal generator 391 for generating a transmitted signal 093 that has user data for the base station 103 in its local cell, a signal generator 392 for generating a transmitted signal 092 that has control information for the base station 102 outside its local cell, a multiplexer 393 for mixing the two transmitted signals by time division multiplexing or the like, and a radio transmitter 394 for transmitting a multiplexed signal 005 as a transmitted signal 006. The entities of the signal generators 391 and 392 are, for example, processing processes generated for every transmission target. While the signal generator 391 ordinarily operates when the mobile station 209 is within the cell 13, the signal generator 392 starts to operate when the mobile station 209 is located in the vicinity of the boundary with the neighboring cell 12 (described below). When the base stations 102 and 103 perform the multi-user detection based on the strength of the received signals, like the SIC, the radio transmitter 394 preferably exchanges the transmission power for the user for that for the control information to output them.

The base station 102 has a multi-user detector 3002. The transmitted signal 002 from the mobile station 208 is supplied as a received signal 003 to the base station 102 through a propagation path having a propagation characteristic H82, and the transmitted signal 006 from the mobile station 209 is also supplied as a received signal 007 to the base station 102 through a propagation path having a propagation characteristic H92. The multi-user detector 3002 detects the received signal 003 for identifying the user by the multi-user detection function such as the SIC to reproduce a signal 082' as the signal generated by the signal generator 381 and to reproduce a signal 083' as the signal generated by the signal generator 382. Similarly, the multi-user detector 3002 detects the received signal 007 for identifying the user to reproduce a signal 093' as the signal generated by the signal generator 391 and to reproduce a signal 092' as the signal generated by the signal generator 392.

The base station 103 has a multi-user detector 3003. The transmitted signal 002 from the mobile station 208 is supplied as a received signal 004 to the base station 103 through a propagation path having a propagation characteristic H83, and the transmitted signal 006 from the mobile station 209 is also supplied as a received signal 008 to the base station 103 through a propagation path having a propagation characteristic H93. The multi-user detector 3003 detects the received signal 004 for identifying the user by the multi-user detection function such as the SIC to reproduce a signal 082" as the signal generated by the signal generator 381 and to reproduce a signal 083" as the signal generated by the signal generator 382. Similarly, the multi-user detector 3003 detects the received signal 008 for identifying the user to reproduce a signal 093" as the signal generated by the signal generator 391 and to reproduce a signal 092" as the signal generated by the signal generator 392.

Figure 7:
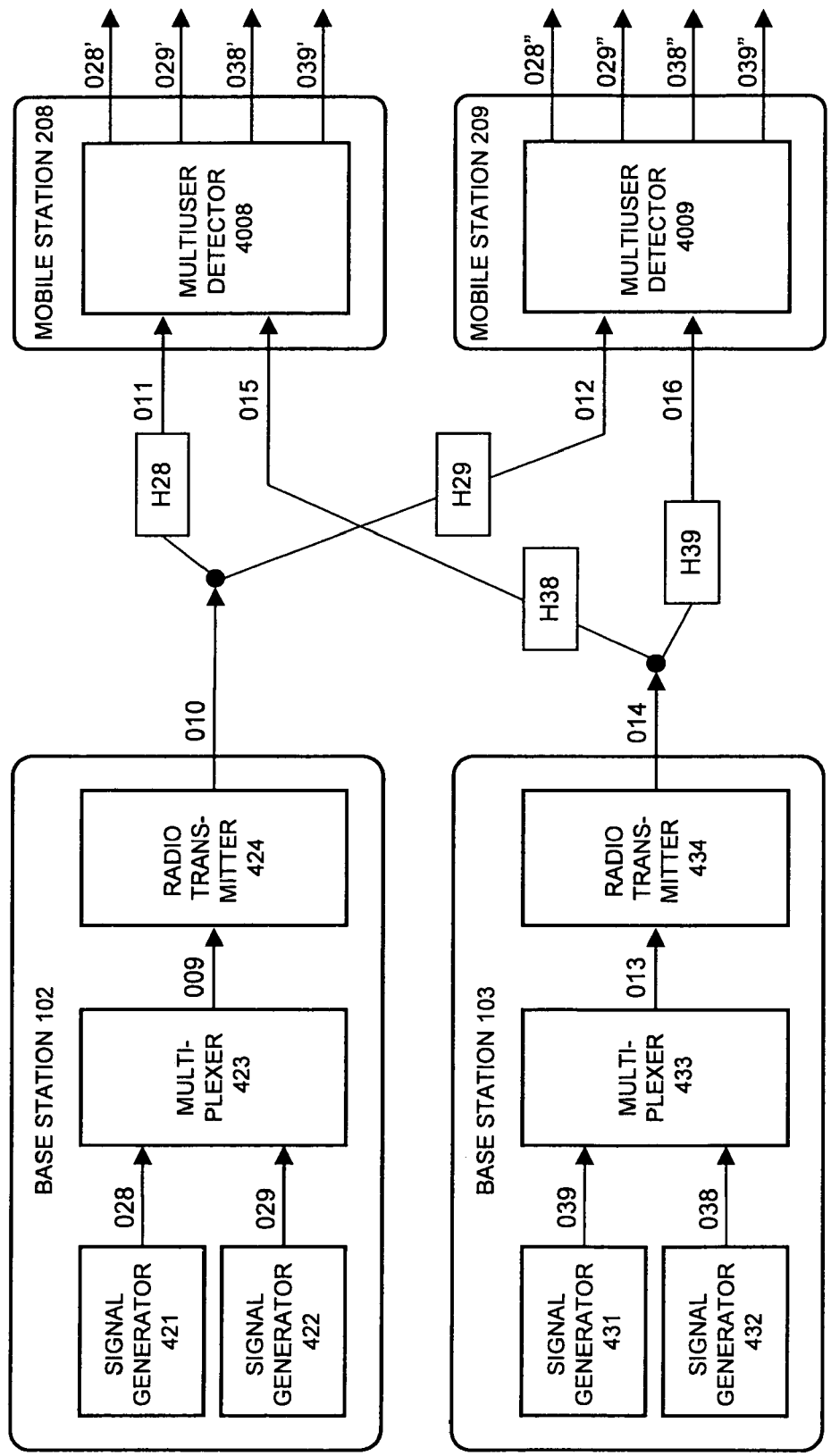
FIG. 7 is a diagram schematically showing the functional structure for performing the multi-user detection at a mobile station in the multi-cell multiple-access radio communication environment shown in FIG. 5.

FIG. 7 is a diagram schematically showing the functional structure for performing the multi-user detection at a mobile station in the multi-cell multiple-access radio communication environment shown in FIG. 5.

The base station 102 includes a signal generator 421 for generating a transmitted signal 028 that has user data for the mobile station 208 in its local cell, a signal generator 422 for generating a transmitted signal 029 that has control information for the mobile station 209 outside its local cell, a multiplexer 423 for mixing the two transmitted signals by time division multiplexing or the like, and a radio transmitter 424 for transmitting a multiplexed signal 009 as a transmitted signal 010. The entities of the signal generators 421 and 422 are, for example, processing processes generated for every transmission target. While the signal generator 421 ordinarily operates for transmitting data to the mobile station 208 within the cell 12, the signal generator 422 starts to operate when the mobile station 209 in the neighboring cell 13 is located in the vicinity of the cell boundary (described below). When the mobile stations 208 and 209 perform the multi-user detection based on the strength of the received signals, like the SIC, the radio transmitter 424 preferably exchanges the transmission power for the user data for that for the control information to output them.

The base station 103 includes a signal generator 431 for generating a transmitted signal 039 that has user data for the mobile station 209 in its local cell, a signal generator 432 for generating a transmitted signal 038 that has control information for the mobile station 208 outside its local cell, a multiplexer 433 for mixing the two transmitted signals by time division multiplexing or the like, and a radio transmitter 434 for transmitting a multiplexed signal 013 as a transmitted signal 014. The entities of the signal generators 431 and 432 are, for example, processing processes generated for every transmission target. While the signal generator 431 ordinarily operates for transmitting data to the mobile station 209 within the cell 13, the signal generator 432 starts to operate when the mobile station 208 in the neighboring cell 12 is located in the vicinity of the cell boundary (described below). When the mobile stations 208 and 209 perform the multi-user detection based on the strength of the received signals, like the SIC, the radio transmitter 434 preferably exchanges the transmission power for the user data for that for the control information to output them.

The mobile station 208 has a multi-user detector 4008. The transmitted signal 010 from the base station 102 is supplied as a received signal 011 to the mobile station 208 through a propagation path having a propagation characteristic H28, and the transmitted signal 014 from the base station 103 is also supplied as a received signal 015 to the mobile station 208 through a propagation path having a propagation characteristic H38. The multi-user detector 4008 detects the received signal 011 for identifying the user by the multi-user detection function such as the SIC to reproduce a signal 028' as the signal generated by the signal generator 421 and to reproduce a signal 029' as the signal generated by the signal generator 422. Similarly, the multi-user detector 4008 detects the received signal 015 for identifying the user to reproduce a signal 039' as the signal generated by the signal generator 431 and to reproduce a signal 038' as the signal generated by the signal generator 432.

The mobile station 209 has a multi-user detector 4009. The transmitted signal 010 from the base station 102 is supplied as a received signal 012 to the mobile station 209 through a propagation path having a propagation characteristic H29, and the transmitted signal 014 from the base station 103 is also supplied as a received signal 016 to the mobile station 209 through a propagation path having a propagation characteristic H39. The multi-user detector 4009 detects the received signal 012 for identifying the user by the multi-user detection function such as the SIC to reproduce a signal 028" as the signal generated by the signal generator 421 and to reproduce a signal 029" as the signal generated by the signal generator 422. Similarly, the multi-user detector 4009 detects the received signal 016 for identifying the user to reproduce a signal 039" as the signal generated by the signal generator 431 and to reproduce a signal 038" as the signal generated by the signal generator 432.

The operating procedure for the mobile station to perform the handoff in the multi-cell multiple-access radio communication system structure shown in FIGS. 5 to 7 will now be described with reference to a sequence diagram in FIG. 8.

(1) Propagation Environment on Cell Boundary between Mobile Station and Base Station For example, a case in which the mobile station 208 moves from the cell 12 toward the cell 13 will be considered. In this case, since the mobile station 208 in the cell 12 is located in the vicinity of the boundary with the cell 13, the base station 103 can also receive the signal from the mobile station 208 located in the adjacent cell 12 in the up-line reception, from the point of radio-wave propagation. The base station 103 considers this signal as a signal targeted at the base station 103 to perform the multi-user detection.

(2) Each Mobile Station Located around Center of Its Local Cell

The mobile station 208 basically communicates with the base station 102 in the cell 12. Specifically, the mobile station 208 receives the information including the user data in the signal generator 381 to generate the signal 082, which is emitted on a radio channel as the signal 002 through the radio transmitter 384 without being multiplexed. Upon reception of the signal 003 through the propagation characteristic H82, the base station 102 demodulates the signal 003 to the signal 082' by the multi-user detection. Transmission and reception operation of the user data, similar to the above operation, is performed between the mobile station 209 and the base station 103.

(3) Arrival of Mobile Station in the Vicinity of Cell Boundary

When the mobile station 208 arrives in the vicinity of the cell boundary under the condition described above, the signal 002 emitted on the radio channel reaches the base station 103 as the signal 004 through the propagation characteristic H83. The base station 103 provided with the multi-user detector 3003 detects the signal 082" resulted from the multi-user detection. Hence, the base station 103 can be aware that the mobile station 208 is located in the vicinity of the cell boundary on the same channel even during communication with the mobile station 209.

(4) Start of Mixture at Base Station

Upon awareness of the entrance of the mobile station 208 into the local cell, the base station 103 mixes some kind of response in the incoming mobile station 208 while being in communication with the mobile station 209 in the local cell. The some kind of response may be message data including an expression, such as "on the cell boundary"or "visible", toward the corresponding mobile station and this message data is used as the control information for the handoff operation.

As shown in FIG. 7, the base station 103 generates the signal 039 for the mobile station 209 in the signal generator 431 and the signal 038 for the mobile station 208 in the signal generator 432. The base station 103 synthesizes the signals 039 and 038 in the multiplexer 433 by the TDMA or the like to generate the signal 013.

Figure 12:
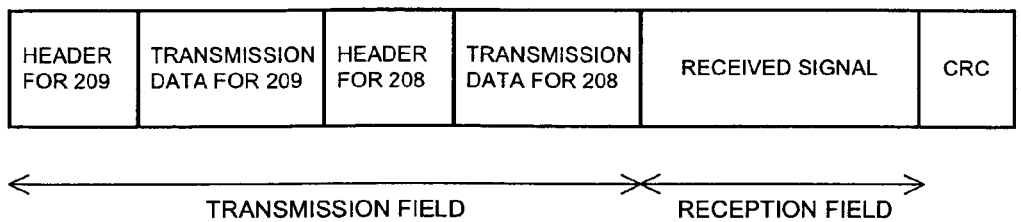
FIG. 12 is a diagram showing a structure example of a packet synthesized by TDMA.

An example of a packet synthesized by the TDMA is shown in FIG. 12. A header section including destination information and so on, a data transmission section for the mobile station 209, which is the original communication target, in the local cell, a data transmission section for the mobile station 208, which is not the original communication target, a received signal section, and a CRC (cyclic redundancy checksum) section for error control are multiplexed in time series. Methods for distinguishing a signal targeted at the original destination and a signal targeted at a station other than the original destination include a method in which the header section is used to specify the leading edge of data.

The base station 103 supplies the generated signal 013 to the radio transmitter 434 for emitting it as the radio signal 014 on the radio channel. Through the radio channel, the radio signal 014 reaches the mobile station 209 that is located in its local cell as the signal 016 through the channel H39 and reaches the mobile station 208 as the signal 015 through the channel H38.

The mobile station 209 having the multi-user detection function detects the received signal 016 by the multi-user detection to reproduce the signals 039" and 038". Similarly, the mobile station 208 detects the received signal 015 by the multi-user detection to reproduce the signals 039' and 038'. Then, the mobile station 208 proceeds to the next operation mode when it recognizes that the incoming signal 038' from the base station 103 is not a signal from the base station in its local cell. As described above, the signal 038 includes an expression, such as "on the cell boundary" or "visible", and the signal 038 is the control information indicating that signals from the base station 103 in the neighboring cell 13 can be received.

(5) Response and Start of Mixture in Mobile Station

When the mobile station 208 is informed that it enters the reception area of the base station 103 from the base station 103 in the neighboring cell 13, the mobile station 208 continues to generate the communication information 082 for the base station 102 in its local cell in the signal generator 381, like before. This information follows the information that has been communicated in the cell 12 by the mobile station 208.

The mobile station 208 generates as the handoff information the information 083 indicating that it requests the handoff in the signal generator 382 and synthesizes the signals 082 and 083 in the multiplexer 383 by the TDMA or the like. The synthesized signal 001 is converted to the transmitted signal 002 in the radio transmitter 384 to be emitted on the radio channel.

On the other hand, the transmitted signal 002 reaches the base station 102 as the signal 003 through the propagation characteristic H82 and reaches the base station 103 as the signal 004 through the propagation characteristic H83. At the base station 102, the signal 003 continues to be demodulated to the signal 082' to be supplied from the mobile station 208 to the base station 102 by the multi-user detection. The base station 103 confirms that the mobile station 208 has acknowledged the reception of the handoff, by demodulating and detecting the handoff-enabling signal 083" for the base station 103 from the signal detected by the multi-user detection.

(6) Mixed Communication at Both Mobile Station and Base Station

The base station 103 generates the information 038 including the control information and so on in the signal generator 432 and, at the same time, generates the communication information 039 for the mobile station 209 in its local cell 13 in the signal generator 431. The base station 103 synthesizes the signals 038 and 039 in the multiplexer 433. The synthesized signal 013 is converted into the transmitted signal 014 in the radio transmitter 434 to be emitted on the radio channel.

The transmitted signal 014 reaches the mobile station 209 as the signal 016 through the radio channel H39 and reaches the mobile station 208 as the signal 015 through the radio channel H38. The mobile station 209 detects the signal 039" that is supplied from the base station 103 in its local cell in the multi-user detector 4009 by the multi-user detection and then demodulates the detected signal. The mobile station 208 that has requested the handoff can demodulate and detect the information 038', such as the control information for the mobile station 208, by performing the multi-user detection in the multi-user detector 4008, as in the same manner, to receive the control information, the data information, and so on from the base station 103 in the neighboring cell 13.

After the handover is determined, the mobile station 208 transmits a disconnection request to the base station 102 and starts to communicate only with the base station 103. In other words, in the mobile station 208, the operation of the signal generator 381 is suspended and only the signal generator 382 operates for continuing to transmit the transmitted signal 083 to the base station 103.

In a series of handoff process described above, the handoff is achieved between the base stations 102 and 103 only with the handoff request from the mobile station 102 without any connection therebetween. Specifically, a base station can receive by the multi-user detection the control information or data including the availability of the handover, which has not been transmitted to the base station, among the information concerning a terminal located outside its local cell. In other words, the amount of traffic on a backbone does not need to be increased in the handover of a mobile station. The multi-user detection is characterized by ordinarily occurring in the vicinity of the cell boundary, from the point of propagation characteristic, so that the multi-user detection probably has an affinity to the handover. Furthermore, the start of the mixture of the control signal for the first time upon detection of the mobile station that approaches the cell boundary permits the effective utilization of the bandwidth.

Figure 9:
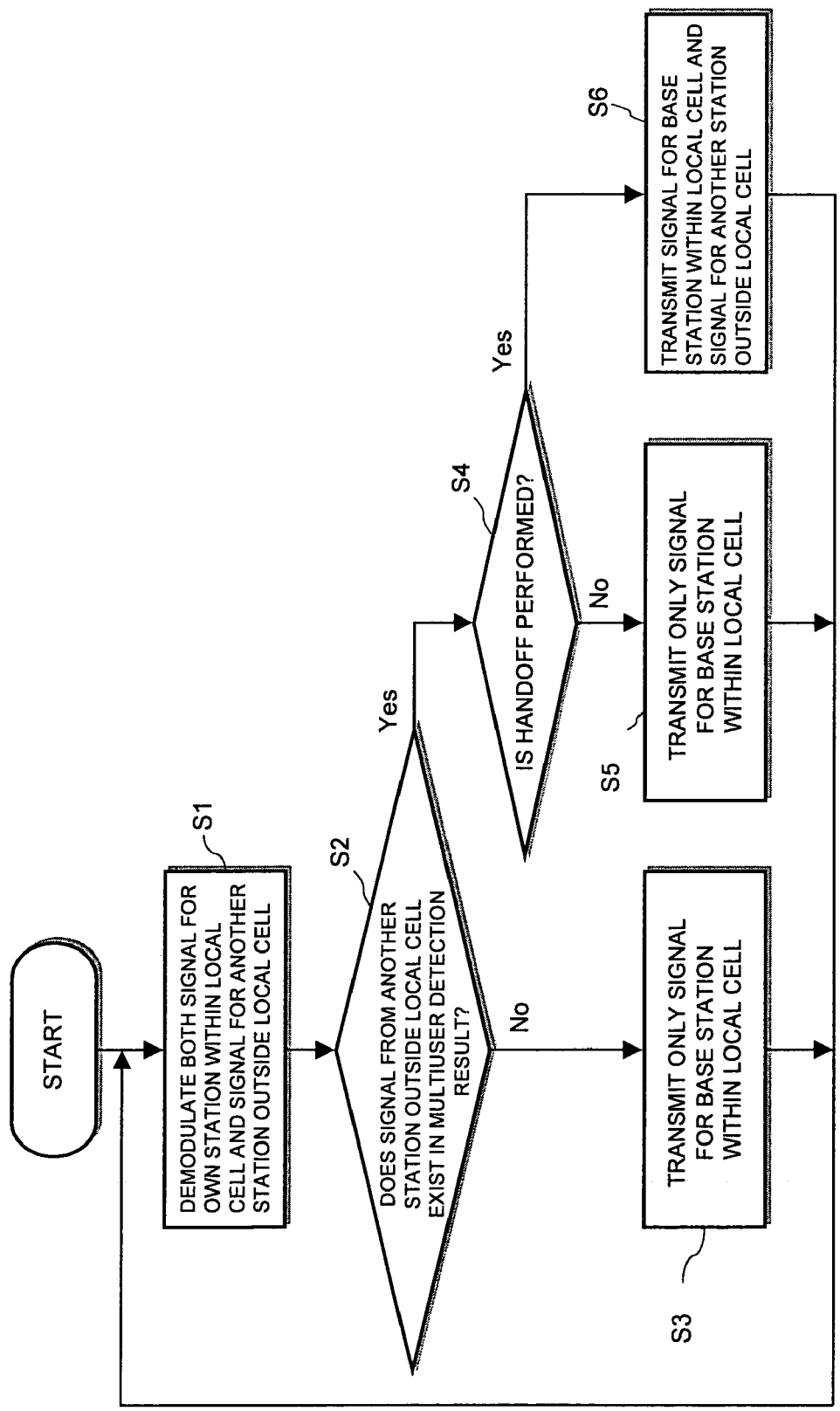
FIG. 9 is a flowchart showing the operating procedure of a radio communication apparatus operating as a mobile station in the multi-cell radio communication environment according to an embodiment of the present invention.

FIG. 9 is a flowchart showing the operating procedure of a radio communication apparatus operating as a mobile station in the multi-cell radio communication environment according to this embodiment.

The mobile station has the multi-user detection function. The mobile station tries to demodulate both the signals for itself within its local cell and the signals for other stations, supplied from outside its local cell, (Step S1), and determines whether the signals from outside its local cell exist (Step S2).

If the signals from outside the local cell do not exist in the received signals, the mobile station transmits only the signals for the base station in its local cell (Step S3).

If the signals from outside the local cell are detected by the multi-user detection, it is determined whether the handoff is performed (Step S4). Since the detection of the signals from outside the local cell would mean that the mobile station approaches the boundary with the neighboring cell and that the field intensity of the received signals from the base station in connection decreases to lower the communication quality, the availability of the handoff is determined in consideration of such situations.

If it is determined that the handoff is not performed, only the signals for the base station in its current local cell are transmitted (Step S5). If it is determined that the handoff is performed, the mixture of the signals for the base station in its current local cell and the signals for the base station of the neighboring cell is transmitted (Step S6). For example, the information, such as the handoff request for the base station of the neighboring cell or the reception of the handoff request, is mixed to be transmitted to the base station of the neighboring cell.

Figure 10:
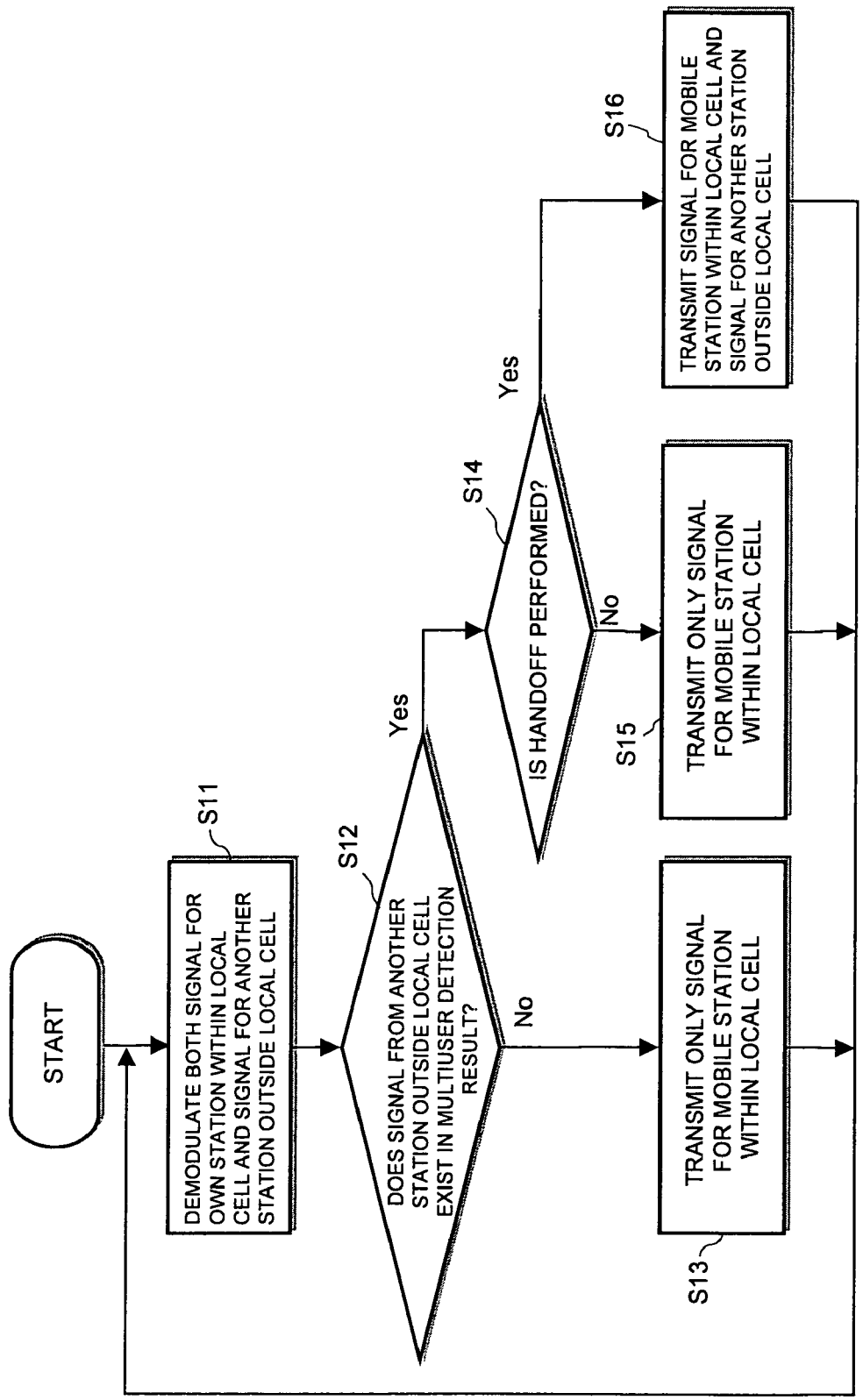
FIG. 10 is a flowchart showing the operating procedure of a radio communication apparatus operating as a base station in the multi-cell radio communication environment according to an embodiment of the present invention.

FIG. 10 is a flowchart showing the operating procedure of a radio communication apparatus operating as a base station in the multi-cell radio communication environment according to this embodiment.

The base station has the multi-user detection function. The base station tries to demodulate both the signals for itself within its local cell and the signals for other stations, supplied from outside its local cell, (Step S11) and determines whether the signals from outside its local cell exist (Step S12).

If the signals from outside the local cell do not exist in the received signals, the base station transmits only the signals for the mobile station in its local cell (Step S13).

If the signals from outside the local cell are detected by the multi-user detection, it is determined whether the handoff is enabled (Step S14). Since the detection of the signals from outside the local cell would mean that the mobile station in the neighboring cell approaches the boundary with the local cell, the availability of the handoff is determined in consideration of such situations.

If it is determined that the handoff is not performed, only the signals for the mobile station in its current local cell are transmitted (Step S15). If it is determined that the handoff is enabled, the mixture of the signals for the mobile station in its current local cell and the handoff-request enabling signal for the mobile station of the neighboring cell is transmitted (Step S16).

Figure 8:
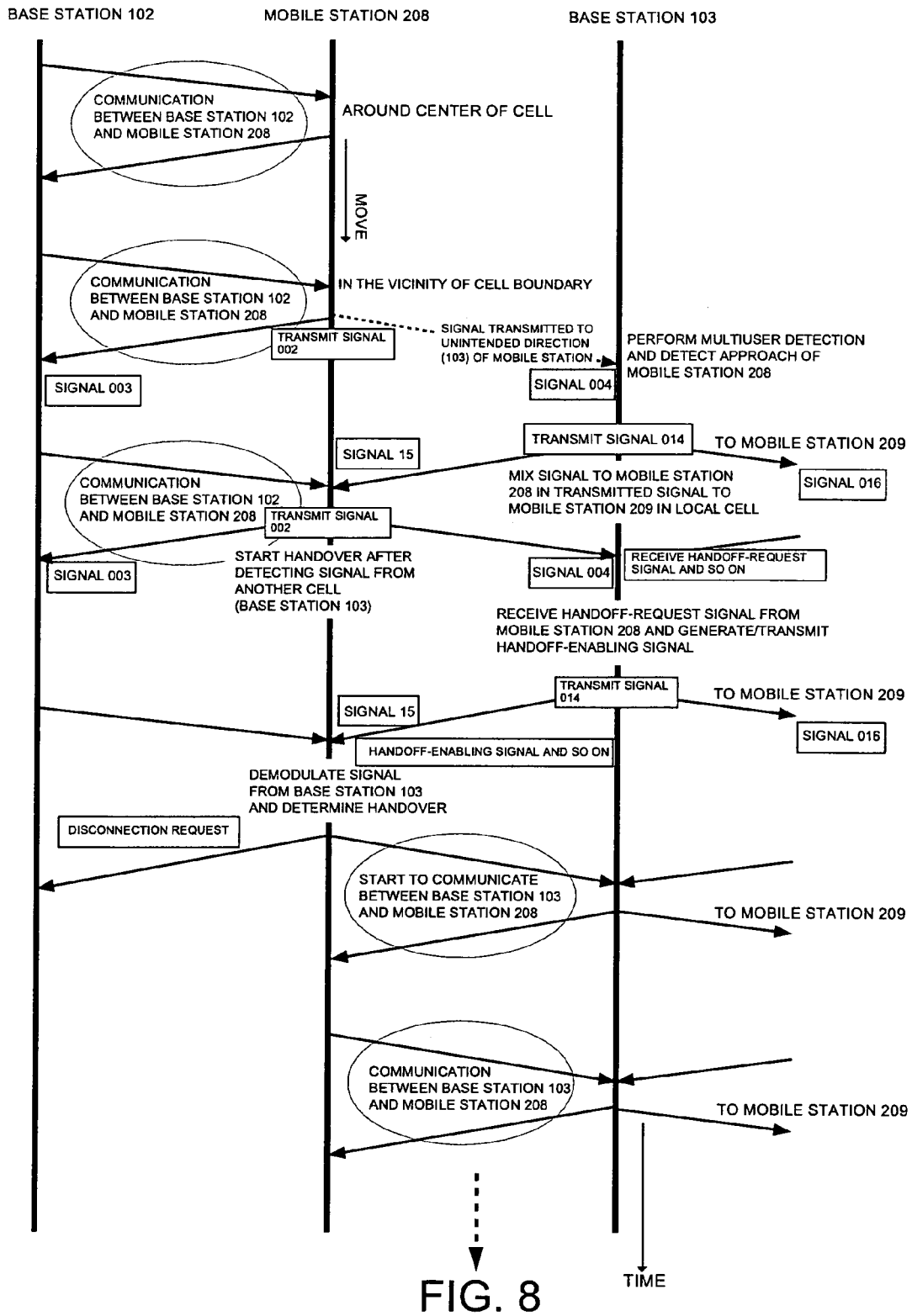
FIG. 8 is a sequence diagram showing the operating procedure for performing base-station-driven handoff of the mobile station in the multi-cell multiple-access radio communication system structure according to an embodiment of the present invention.

The operation sequence of the handoff shown in FIG. 8 is involved in the base-station-driven handover based on the multi-user detection of the signals from the mobile station 208 located in the vicinity of the neighboring cell by the base station 103. In contrast, mobile-station-driven handover can be performed based on the multi-user detection of the signals from the base station of the neighboring cell by the mobile station. The latter handoff procedure will now be described with reference to the operation sequence shown in FIG. 11.

(1) Propagation Environment on Cell Boundary between Mobile Station and Base Station For example, a case in which the mobile station 208 moves from the cell 12 toward the cell 13 will be considered. In this case, since the mobile station 208 in the cell 12 is located in the vicinity of the boundary with the cell 13, the mobile station 208 can also receive the signal from the base station 103 in the adjacent cell 13 in the down-line reception, from the point of radio-wave propagation. The mobile station 208 considers this signal as a signal targeted at the mobile station 208 to perform the multi-user detection.

(2) Each Mobile Station Located around Center of Its Local Cell

The mobile station 208 basically communicates with the base station 102 in the cell 12. Specifically, the base station 102 receives the information including the user data in the signal generator 421 to generate the signal 028, which is emitted on a radio channel as the signal 010 through the radio transmitter 424 without being multiplexed. Upon reception of the signal 011 through the propagation characteristic H28, the mobile station 208 demodulates the signal 011 to the signal 028' by the multi-user detection. Transmission and reception operation of the user data, similar to the above operation, is performed between the base station 103 and the mobile station 209. Namely, the base station 103 receives the information including the user data in the signal generator 431 to generate the signal 039, which is emitted on the radio channel as the signal 014 through the radio transmitter 434 without being multiplexed.

(3) Arrival of Mobile Station in the Vicinity of Cell Boundary

When the mobile station 208 arrives in the vicinity of the cell boundary under the condition described above, the signal 014 emitted on the radio channel by the base station 209 reaches the mobile station 103 as the signal 015 through the propagation characteristic H38. The mobile station 208 provided with the multi-user detector 4008 detects the signal 039" resulted from the multi-user detection. Hence, the mobile station 208 can be aware that the mobile station 208 is in the vicinity of the cell boundary toward the base station 103 on the same channel even during communication with the base station 102.

(4) Start of Mixture at Mobile Station

Upon awareness of being in the vicinity of the boundary with the neighboring cell 13, the mobile station 208 sends some kind of response to the base station 103 in the neighboring cell 13 while being in communication with the base station 102 in the cell 12 where the mobile station 208 is located. The some kind of response may be message data including an expression, such as "on the cell boundary" or "visible", and this message data is used as the control information for the handoff operation.

As shown in FIG. 6, the mobile station 208 generates the signal 082 for the base station 102 in the signal generator 381 and the signal 083 for the base station 103 in the signal generator 382. The mobile station 208 synthesizes the signals 082 and 083 in the multiplexer 383 by the TDMA or the like to generate the signal 001. The mobile station 208 supplies the generated signal 001 to the radio transmitter 384 for emitting it as the radio signal 002 on the radio channel. Through the radio channel, the radio signal 002 reaches the base station that is currently in connection with as the signal 003 through the channel H82 and reaches the base station 103 in the neighboring cell 12 as the signal 004 through the channel H83.

The base station 103 having the multi-user detection function detects the received signal 004 by the multi-user detection to reproduce the signals 082" and 083". Similarly, the base station 102 detects the received signal 003 by the multi-user detection to reproduce the signals 082' and 083'. Then, the base station 103 proceeds to the next operation mode when it recognizes that the incoming signal 083" from the mobile station 208 is not a signal from a mobile station in the local cell 13. As described above, the signal 083 includes an expression, such as "on the cell boundary" or "visible", and the signal 083 is the control information indicating that signals from the mobile station 208 in the vicinity of the boundary with the neighboring cell 12 can be received.

(5) Response and Start of Mixture in Base Station

When the base station 103 is informed that the mobile station 208 in the vicinity of the boundary with the neighboring cell 12 enters the reception area of the base station 103, the base station 103 continues to generate the communication information 039 for the mobile station 209 in the local cell 13 in the signal generator 431, like before. This information follows the information that has been communicated in the cell 13 by the base station 103.

The base station 103 generates as the handoff information the handoff-enabling signal 038 in response to the handoff request in the signal generator 432 and synthesizes the signals 039 and 038 in the multiplexer 433 by the TDMA or the like. The synthesized signal 013 is converted to the transmitted signal 014 in the radio transmitter 434 to be emitted on the radio channel.

On the other hand, the transmitted signal 014 reaches the mobile station 208 as the signal 015 through the propagation characteristic H38 and reaches the mobile station 209 as the signal 016 through the propagation characteristic H39. At the mobile station 209, the signal 016 continues to be demodulated to the signal 039" to be supplied from the base station 103 to the mobile station 209 by the multi-user detection. The mobile station 208 confirms that the base station 103 has acknowledged the reception of the handoff, by demodulating and detecting the handoff-enabling signal 038' for the mobile station 208 from the signal detected by the multi-user detection.

(6) Mixed Communication at Both Mobile Station and Base Station

The mobile station 208 generates the information 083 including the control information and so on in the signal generator 382 and, at the same time, generates the communication information 082 for the base station 102 in its local cell 12 in the signal generator 381. The mobile station 208 synthesizes the signals 082 and 083 in the multiplexer 383. The synthesized signal 001 is converted into the transmitted signal 002 in the radio transmitter 384 to be emitted on the radio channel.

The transmitted signal 002 reaches the base station 102 as the signal 003 through the radio channel H82 and reaches the base station 103 as the signal 004 through the radio channel H83. The base station 102 detects the signal 082' that is supplied from the mobile station 208 in its local cell 12 in the multi-user detector 3002 by the multi-user detection and then demodulates the detected signal. The base station 103 that has submitted the handoff-enabling signal can demodulate and detect the information 083", such as the control information for the base station 103, by performing the multi-user detection in the multi-user detector 3003, as in the same manner, to receive the control information, the data information, and so on from the mobile station 208 in the neighboring cell 12.

After the handover is determined, the mobile station 208 transmits a disconnection request to the base station 102 and starts to communicate only with the base station 103. In other words, in the mobile station 208, the operation of the signal generator 381 is suspended and only the signal generator 382 operates for continuing to transmit the transmitted signal 083 to the base station 103.

In a series of handoff process described above, the handoff is achieved between the base stations 102 and 103 only with the handoff request from the mobile station 102 without any connection therebetween. Specifically, a base station can receive by the multi-user detection the control information or data including the availability of the handover, which has not been transmitted to the base station, among the information concerning a terminal located outside its local cell. In other words, the amount of traffic on the backbone does not need to be increased in the handover of a mobile station.

Figure 11:
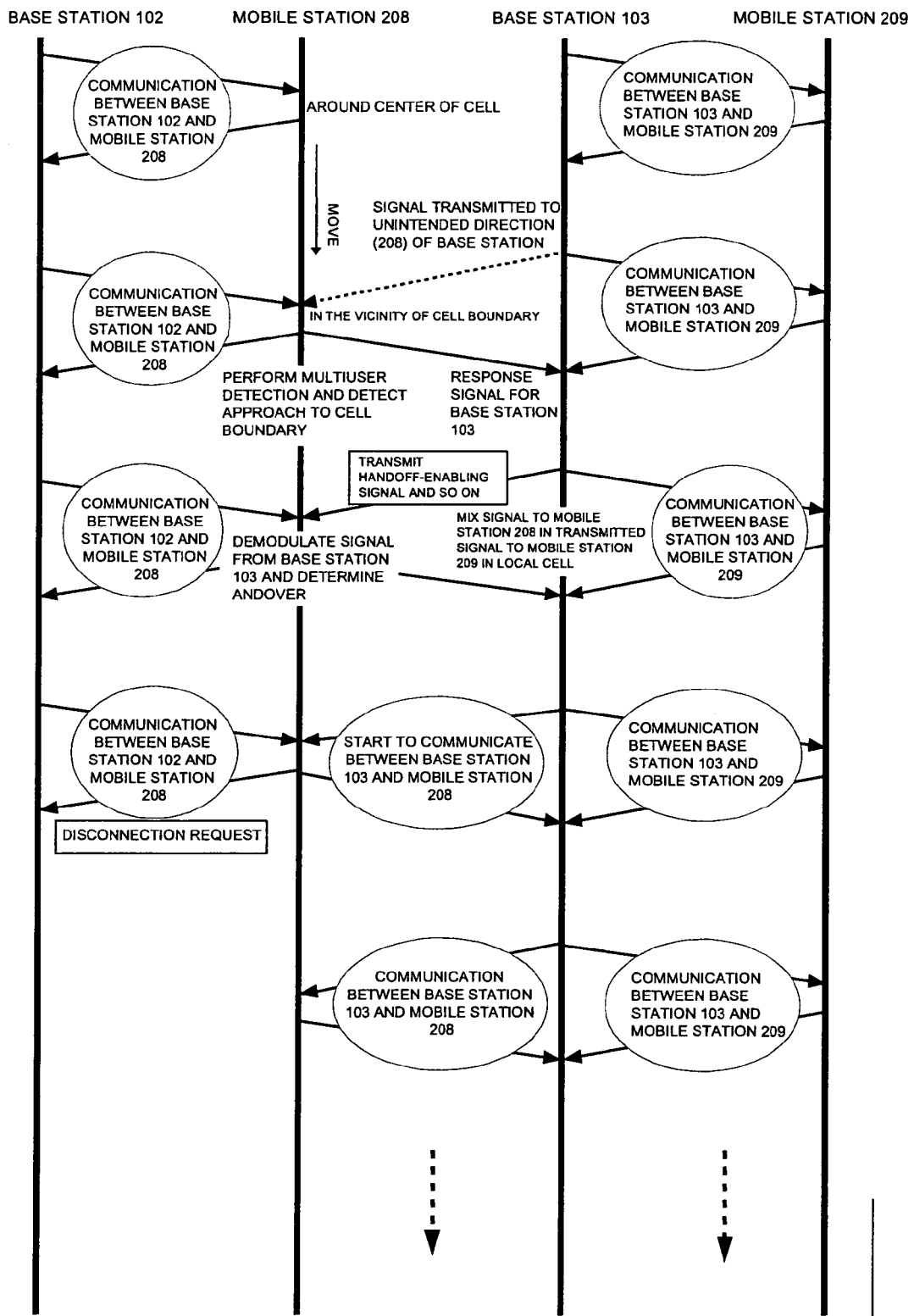
FIG. 11 is a sequence diagram showing the operating procedure for performing mobile-station-driven handoff of the mobile station in the multi-cell multiple-access radio communication system structure according to an embodiment of the present invention.

Methods for starting the terminal-driven handover request (that is, the handover request without the backbone), as shown in FIGS. 8 and 11, include a method in which the field strength is monitored to determine that a mobile station is located in the vicinity of the cell boundary if the received field strength from a desired base station decreases and a method in which it is determined whether a mobile station is located in the vicinity of the cell boundary by using position information acquired by a GPS (Global Positioning System) or the like or by using a method for measuring the distance between the mobile station and the base station with radio waves. Such methods may be automatically performed by a system or may be manually performed by the user.

According to the embodiment described above, the mixture of the signals for a station outside the local cell is not started until it is determined that the mobile station is located in the vicinity of the cell boundary. In such a case, broader bandwidth can be allocated for the transmission of user data without the handover, thus improving the data transmission efficiency. Although various criteria for starting the mixture of the signals can be offered, they are not mentioned in this description.

In this description, "being within a cell" means to be within the cell of the base station to which a mobile station belongs (on which a mobile station is registered). The multi-user detection is performed not only when the mobile station is located in the vicinity of the cell boundary but also when the mobile station is located around the center of its local cell. In the latter case, the interference from other stations is decreased. It is possible to categorize signals into "signals for the local station" and "other signals". When a mobile station is located in the boundary between two cells and the handoff is to be performed, both the signals for the mobile station from the two base stations and other signals are received as desired signals.

Figure 13:
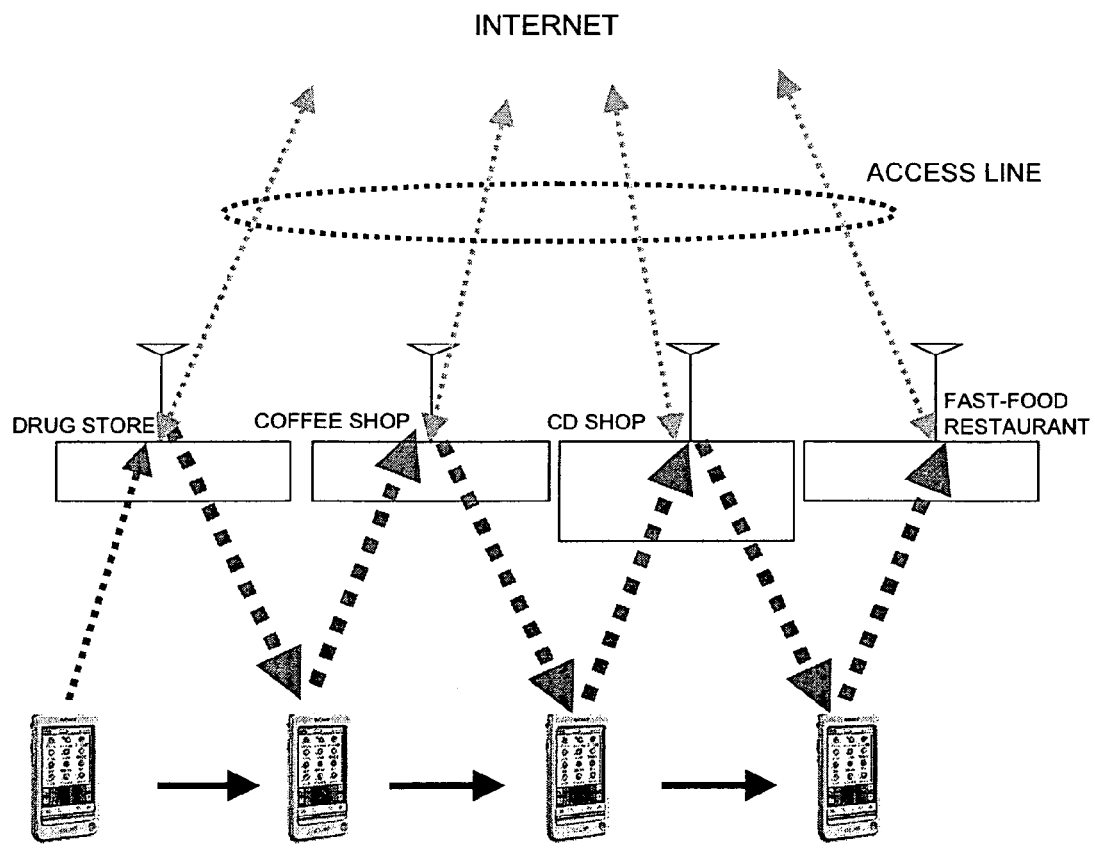
FIG. 13 is a diagram showing an example in which the handoff is realized without a mechanism for controlling plural access points.

FIG. 13 is a diagram showing an example in which the present invention is applied to the handoff in a hot-spot service.

In recent years, hotspot services that offer an Internet-access service by installing access points for a wireless LAN in a store such as a coffee shop have become widespread. Under the present situation, each access point is only connected to the Internet, so that the user cannot move between hotspots while enabling the handoff. This is because the access points are planlessly provided by the respective stores and a mechanism for controlling a plurality of access points (a mobile communication control center (MSC) for a cellular system) does not exist. An "access point" here is substantially synonymous with a base station.

Conducting the respective handoff processes according to the present invention shown in FIGS. 8 and 11 by access points and mobile terminals, each having the multi-user detection, can realize the handoff without a mechanism for controlling the plural access points, as shown in FIG. 13.

Each access point, such as a drug store or a coffee shop, is only connected to the Internet; whereas each mobile station seamlessly realizes the handoff while establishing a connection with each of the access points. There is no need for providing the plural access points according to the plan.

Figure 14:
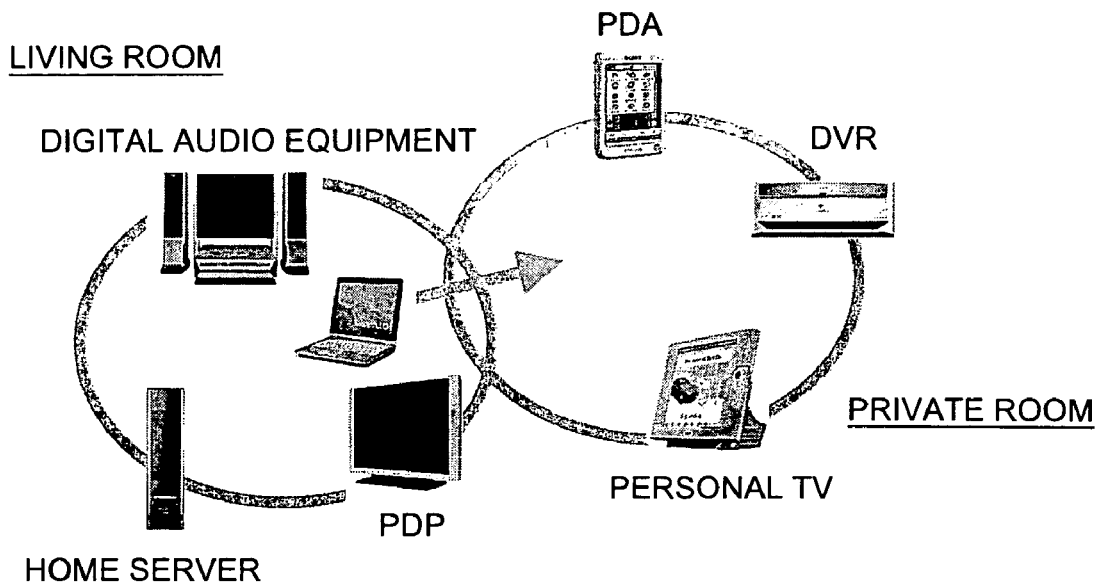
FIG. 14 is a diagram showing an example in which the handoff is realized in a ubiquitous network.
Figure 15:
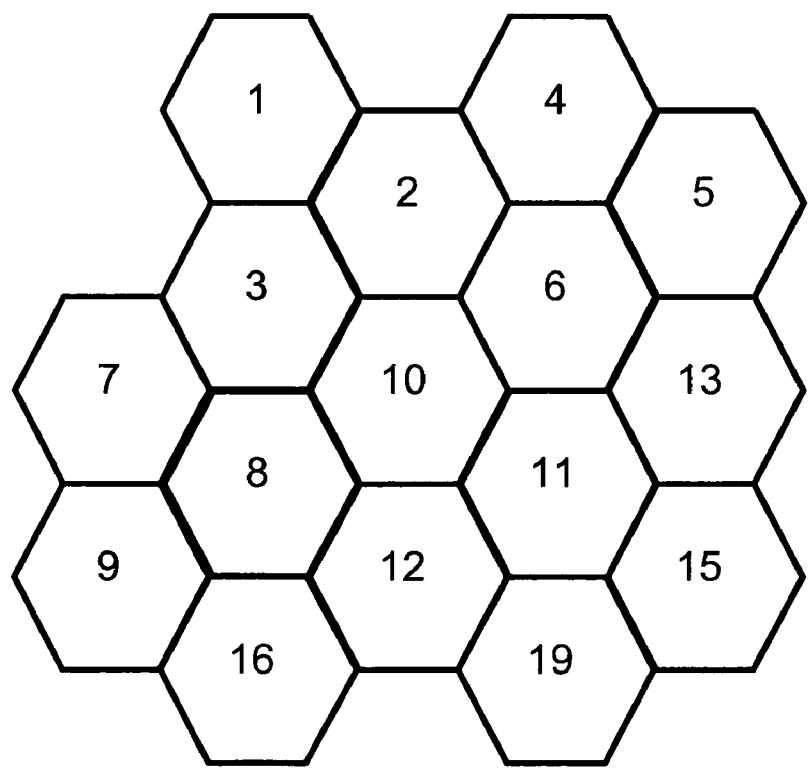
FIG. 15 is a diagram schematically showing the cell structure in a mobile radio communication system in which a service area is two-dimensionally expanded with plural base stations.
Figure 16:
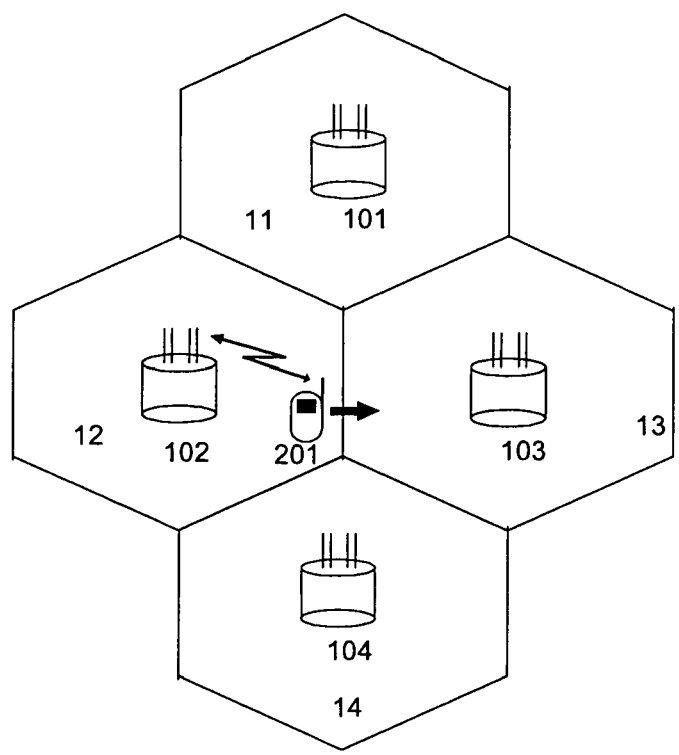
FIG. 16 is a diagram showing an example in which a mobile station 201 moves toward a cell 13 while communicating with a base station 102 in a cell 12.
Figure 17:
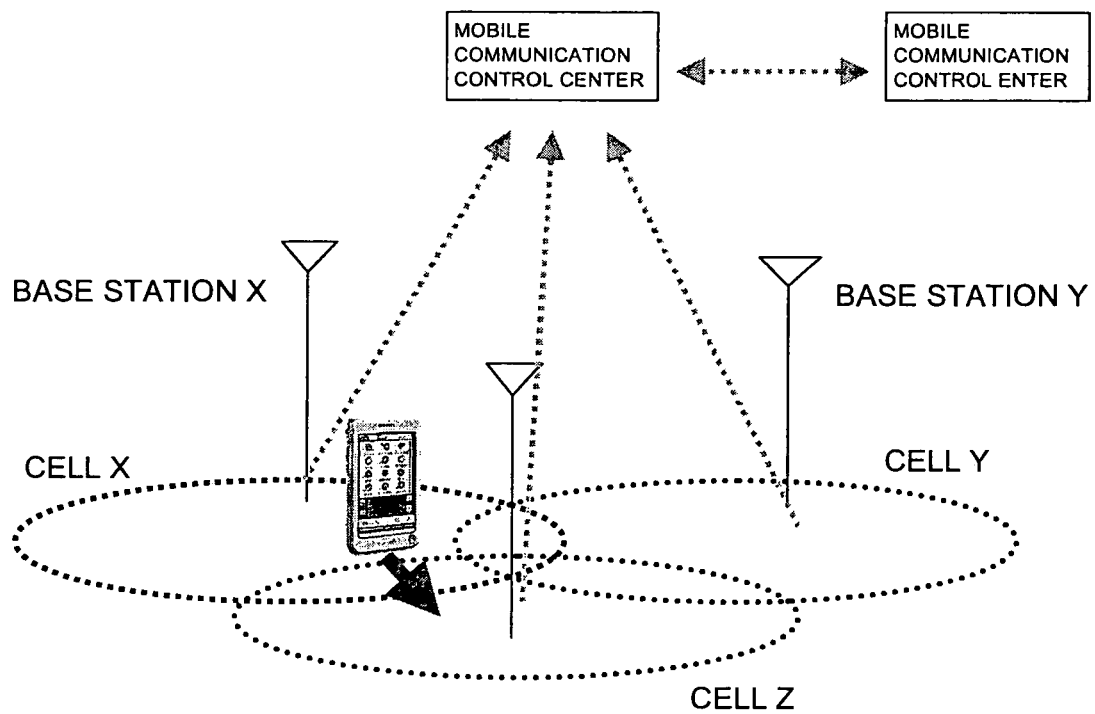
FIG. 17 is a diagram exemplifying an infrastructure of a mobile communication control center that controls plural base stations.

FIG. 14 is a diagram showing an example in which the present invention is applied to the handoff in a ubiquitous network.

In recent years, ubiquitous networks in which all electrical equipment in a house or an office is connected over a network have been of interest to people. In a ubiquitous network, different access points are provided in a living room and a private room, as shown in FIG. 14.

Although a mechanism for controlling a plurality of access points is required in a known handoff process, conducting the handoff process according to the present invention shown in FIGS. 8 and 11 can realize the handoff without the mechanism for controlling a plurality of access points.

In this manner, it is possible for the mobile station to seamlessly realize the handoff while establishing a connection with each access point even when the user randomly provides electrical equipment that is an access point.

Supplement

The present invention has been described in its preferred form with a certain degree of particularity. However, it will be obvious to those skilled in the art that various changes and modifications may be made in the invention without departing from the spirit and scope thereof. The present invention is therefore illustrative and not restrictive. It is to be understood that the scope of the invention is determined by the following claims.

INDUSTRIAL APPLICABILITY

The present invention can provide a superior radio communication system in which a plurality of mobile terminals simultaneously communicates with one base station by multiple-access, a radio communication apparatus and radio communication method, and a computer program.

The present invention can provide a superior radio communication system in which a mobile station can switch the base station to another base station outside its local cell without requiring connection between the base stations, for example, during handoff or when the cell is overloaded, a radio communication apparatus and radio communication method, and a computer program.

The present invention can provide a superior radio communication system in which the mobile-terminal-driven handoff can be realized even if the base stations are planlessly provided, a radio communication apparatus and radio communication method, and a computer program.

According to the present invention, handoff start signals and handoff stop signals are unnecessary as independent signals, thus improving the throughput of the entire communication system.

The invention claimed is:

1. A radio communication system having a multi-cell multi-user structure, comprising:
   a plurality of base stations in respective adjacent or neighboring cells, wherein the respective base stations are capable of communicating and share a channel on a space, time, and/or frequency basis;
   wherein each base station that has a multi-user detection function determines that a first mobile station outside a local cell thereof approaches a boundary with a neighboring cell based on detection of a transmitted signal from the first mobile station for identifying a user, and said base station mixes and synthesizes a synthesized signal including user data for a second mobile station within the local cell and control information for the first mobile station outside the local cell and outputs the synthesized signal at a frequency;
   wherein the multi-user detection function applies a successive interference cancellation technique to distinguish a first signal transmitted at the frequency by the first mobile station from a second signal transmitted at the same frequency by the second mobile station,
   the synthesized signal being used to perform a handoff of the first mobile station from a base station corresponding to the neighboring cell to the base station corresponding to the local cell without conducting any communication other than communication with a mobile station.

2. The radio communication system according to claim 1, wherein the first mobile station outside the local cell transmits a request for handoff to the base station in the neighboring cell and disconnects from an original base station for the handoff in response to the handoff that is enabled.

3. A radio communication system having a multi-cell multi-user structure in which cells where the respective base stations are capable of communicating and share a channel on a space, time, and/or frequency basis;
   wherein a mobile station that has a multi-user detection function determines that the mobile station approaches a boundary with a neighboring cell based on detection of a transmitted signal from a base station outside a local cell thereof for identifying a user, and mixes and produces a synthesized signal including user data for the base station within the local cell and control information for the base station in the neighboring cell and outputs the synthesized signal at a frequency;

wherein the multi-user detection function applies a successive interference cancellation technique to distinguish transmitted signals having the same frequency from the base station within the local cell and the base station outside the local cell, the synthesized signal being used to perform a handoff of the mobile station from the base station corresponding to the local cell to the base station corresponding to the neighboring cell without conducting any communication other than communication with a mobile station.

4. The radio communication system according to claim 1, wherein the base station in the neighboring cell transmits a handoff-enabling signal in response to reception of a signal from the mobile station, and wherein the mobile station disconnects from a base station to which it is connected to for the handoff-enabling signal.

5. A radio communication apparatus operating in a radio communication environment that has a multi-cell multi-user structure in which cells where the respective base stations are capable of communicating share a channel on a space, time, and/or frequency basis; the radio communication apparatus comprising:

multi-user detection means for detecting a plurality of received signals as desired signals; and multiple-signal transmission means for mixing and producing a synthesized signal from a signal for a station within a local cell and a signal for a station outside the local cell in response to the detection of a transmitted signal from the station outside the local cell for identifying a user by the multi-user detection means and outputting the synthesized signal at a frequency;

wherein the multi-user detection means applies a successive interference cancellation technique to distinguish signals having the same frequency for the station within the local cell and the station outside the local cell, the synthesized signal being used to perform a handoff of a mobile station between a base station within the local cell and a base station outside the local cell without conducting any communication other than communication with a mobile station.

6. The radio communication apparatus according to claim 5, wherein the multi-user detection means detects all the received signals by demodulating the received signals, each received signal being a sum of noise and an incoming signal from each transmitting station within and outside the local cell and being propagated through each respective propagation characteristic, in descending order of received power, and repeating a process of canceling selected received signals at a receiving station.

7. The radio communication apparatus according to claim 6, wherein the multiple-signal transmission means exchanges a transmission power of a signal for a station within the local cell for a transmission power of a signal for a station outside the local cell and outputs exchanged transmission power signals.

8. The radio communication apparatus according to claim 5, wherein the radio communication apparatus operates as a base station that is connected to one or more mobile stations in a cell where the base station is capable of communicating, wherein the multiple-signal transmission means outputs the synthesized signal, upon determining that the mobile station outside the local cell approaches a boundary with a neighboring cell based on detection of a transmitted signal from the mobile station outside the local cell for identifying a user by the multi-user detection means, and wherein the radio communication apparatus enables a handoff in response to a request for the handoff from the mobile station outside the local cell.

9. The radio communication apparatus according to claim 5, wherein the radio communication apparatus operates as a mobile station located in a cell provided by a base station, wherein the multiple-signal transmission means outputs the synthesized signal upon determining that the mobile station approaches a boundary with the neighboring cell based on detection of a transmitted signal from a base station outside the local cell for identifying a user by the multi-user detection means, and wherein the radio communication apparatus performs a handoff in response to a handoff allowance from the base station in the neighboring cell.

10. A radio communication method in a radio communication environment that has a multi-cell multi-user structure in which cells where the respective base stations are capable of communicating share a channel on a space, time, and/or frequency basis; the radio communication method comprising:

a multi-user detection step for detecting a plurality of received signals as desired signals; and a multiple-signal transmission step for mixing and producing a synthesized signal at a frequency from a signal for a station within a local cell and a signal for a station outside the local cell and outputting the synthesized signal in response to a detection of a transmitted signal from the station outside the local cell for identifying a user in the multi-user detection step;

wherein the multi-user detection step applies a successive interference cancellation technique to distinguish signals having the same frequency for the station within the local cell and the station outside the local cell, the synthesized signal being used to perform a handoff of a mobile station between a base station within the local cell and a base station outside the local cell without conducting any communication other than communication with a mobile station.

11. The radio communication method according to claim 10, wherein the multi-user detection step detects all the received signals by demodulating the received signals, each received signal being a sum of noise and an incoming signal from each transmitting station within and outside the local cell and being propagated through each respective propagation characteristic, in descending order of received power, and repeating a process of canceling selected received signals at a receiving station.

12. The radio communication method according to claim 10, wherein the multiple-signal transmission step exchanges a transmission power of a signal for a station within the local cell for a transmission power of a signal for a station outside the local cell and outputs exchanged transmission power signals.

13. The radio communication method according to claim 10, for operating a base station connected to one or more mobile stations in a cell where the base station is capable of communicating, wherein the multiple-signal transmission step outputs the synthesized signal upon determining that the mobile station outside the local cell approaches a boundary with a neighboring cell based on a detection of a transmitted signal from the mobile station outside the local cell for identifying a user in the multi-user detection step, and wherein the radio communication method further comprises a handoff-enabling step of enabling a handoff in response to a request for the handoff from the mobile station outside the local cell.

14. The radio communication method according to claim 10, for operating as a mobile station located in a cell provided by a base station, wherein the multiple-signal transmission step outputs the synthesized signal upon determining that the mobile station approaches a boundary with the neighboring cell based on detection of a transmitted signal from a base station outside the local cell for identifying a user in the multi-user detection step, and wherein the remote communication method further comprises a handoff step for performing a handoff in response to a handoff allowance from the base station in the neighboring cell.

* * * * *